United States Patent [19]
Cox et al.

[11] Patent Number: 5,812,533
[45] Date of Patent: Sep. 22, 1998

[54] SERVICE PROVISION IN COMMUNICATIONS NETWORKS

[75] Inventors: Richard D. Cox, Garland; Andrew T. Hunter, Dallas; Jeffrey K. Rand, Coppell, all of Tex.

[73] Assignee: British Telecommunications public limited company, London, England

[21] Appl. No.: 619,660

[22] PCT Filed: Feb. 28, 1995

[86] PCT No.: PCT/GB95/00421

§ 371 Date: Dec. 26, 1996

§ 102(e) Date: Dec. 26, 1996

[87] PCT Pub. No.: WO95/23483

PCT Pub. Date: Aug. 31, 1995

[30] Foreign Application Priority Data

Feb. 28, 1994 [EP] European Pat. Off. ............ 94301397

[51] Int. Cl.$^6$ ............................ H04L 12/16; H04Q 11/00
[52] U.S. Cl. ........................... 370/259; 370/409; 455/4.2; 348/7
[58] Field of Search ................................ 370/259, 399, 370/409, 432; 455/3.1, 4.2; 348/6, 7; 395/200.33, 200.49, 200.57, 235, 625, 680, 683

[56] References Cited

U.S. PATENT DOCUMENTS

| | | | |
|---|---|---|---|
| 5,475,819 | 12/1995 | Miller et al. | 395/200.33 |
| 5,519,443 | 5/1996 | Salomon et al. | 348/467 |
| 5,621,734 | 4/1997 | Mann et al. | 395/200.57 |

FOREIGN PATENT DOCUMENTS

WO A 92
11724   7/1992   WIPO.

OTHER PUBLICATIONS

Wyatt et al, "British Telecom's Approach to the Intelligent Network", Second IEE National Conference On Telecommunications, York GB, p. 397.

Sivey, "Planning of Intelligent Network Services", Annual Review Of Communications, vol. 47, 1993–1994, Chicago, US. pp. 428–434.

Brosemer et al, "Virtual Networks: Past, Present and Future", IEEE Communications Magazine, vol. 30, No. 3, Mar. 1992, New York, US, pp. 80–85.

Desbiens et al, "Modeling and Formal Specification of the Personal Communication Service", IEEE INFOCOM'93, vol. 2, 28 Mar. 1992, San Francisco, US, pp. 756–765.

Malek et al, "On–Line Provisioning of Network Services", IEEE Journal of Selected Areas In Communication, vol. 6, New York, US, p. 662.

Stowe, "Service Management for the Advanced Intelligent Network", Globecom 91, Session 46, Paper 4, vol. 3, Phoenix, US, p. 1667.

Maeda et al, "An Intelligent Customer–Controlled Switching System", IEEE Global Telecommunications Conference & Exhibition 1988, Sessioin 46, Paper 1, vol. 3, Hollywood, FA US, p. 1499.

*Primary Examiner*—Ajit Patel
*Attorney, Agent, or Firm*—Nixon & Vanderhye P.C.

[57] ABSTRACT

A communications network offers a variety of services to the customer while being able to add or modify the portfolio of services available. A service delivery infrastructure is provided, which would sit in the Service Control Point of an intelligent network architecture, and which delivers services using an array of service independent features. In the arrangement described, the service delivery infrastructure has an object oriented architecture and interacts with systems, such as billing and network management in the communications network by means of objects within the infrastructure. An aspect of the infrastructure is the provision of selected sets of services to users of the communications network, which selected sets effectively provide dedicated service networks to each customer.

14 Claims, 24 Drawing Sheets

SDI Constituent parts

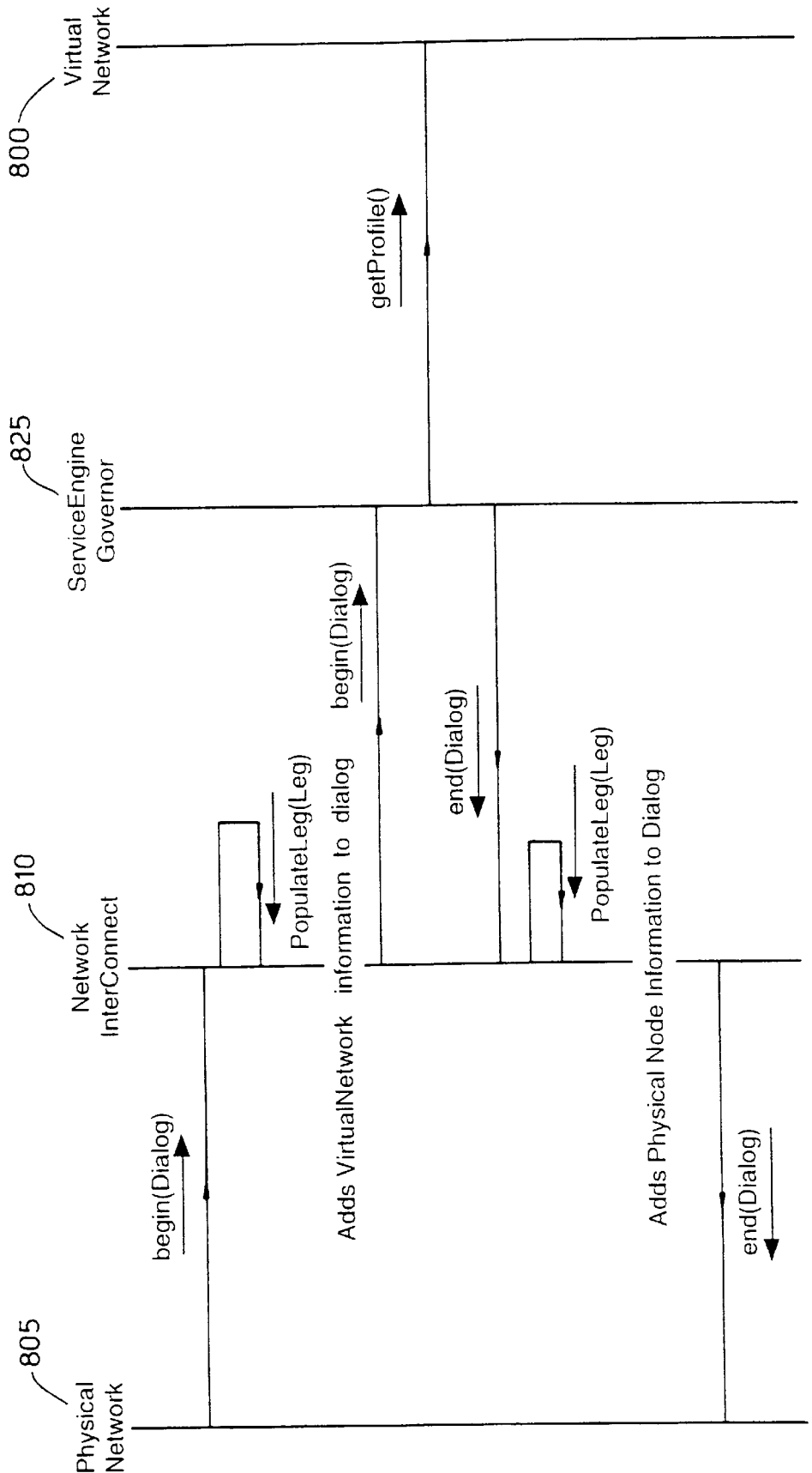

SERVICE PROVISION IN COMMUNICATIONS NETWORKS

BACKGROUND OF THE INVENTION

1. Field of the Invention

The present invention relates to the provision of services over communications networks. If finds particular application in networks where intelligence, that is decision-making or data processing software, is provided elsewhere than in network transmission and switching apparatus, such as in networks having an "intelligent network" architecture for instance.

2. Related Art

In communications networks technology, an area which is fast evolving is that of providing a choice of services to network users. These services might be voice, data, video or multimedia-based for example and reply on different network capabilities. Increasingly, and more so in the future, services over a single network may be provided by several different service providers, and the network provider may be a different entity again. That is, the world of communications services, or information services, is growing much more flexible but also complex.

It is desirable, particularly for the network operator but also for service providers, that services can be introduced quickly and flexibly, without undue delay or cost. Both the network operator and the service provider will need to be able to provide those services to customers as fast and as cheaply as can be achieved.

A development in recent years, in the switched telecommunications environment, has been the provision of intelligence in communications networks which lies elsewhere in the network architecture than in the switches, or exchanges, for switching traffic in the network. This allows much improved flexibility in service provision, since it is no longer necessary to update all the network switches to install a new service, but still only goes as far as laying a basis for developments in service provision. The infrastructure needed to deal with not only technical support for a new service, such as number translation facilities or transmission bandwidth, but also management aspects, such as billing and charging, and order handling, is still a major challenge.

FIG. 1 shows schematically a basic intelligent network (IN) model. The transmission network 100 connects customer premises equipment (CPE) 105 by means of switches 110. However, above the transmission network level, there is the service control level, incorporating Service Control Points (SCPs) 115, and above that again comes the service management level, incorporating a Service Management System (SMS) 120.

The IN equipment is used to provide services over and above basic telephony, this being provided by means of the transmission network as of old. The IN type services, such as those based on number translation, are provided differently.

Each switch 110 incorporates a Service Switching Point (SSP). When a call comes into a switch 110 from CPE 105, the Service Switching Point is used to pick out calls identified as needing Intelligent Network services. It does this by reference to trigger tables in the SSP. If the call is an IN call, which will usually be identified by the associated destination number, the SSP in the switch 110 triggers intelligent processing by passing a request to an SCP 115. The processing of the numbers which do not trigger at the SSP in the switch 110 proceed to be routed and carried by the transmission network 100 as in the past.

On receipt of a request, an SCP 115 uses call-related information, usually the destination number, to locate service logic which it then executes. This service logic execution is done in a "Service Logic Execution Environment", of SLEE, in the SCP. A Service Data Point (SDP) 125 is used by the SCP 115 for information it needs in processing. After execution of the service logic, the SCP 115 passes control back to the switch 110 and the call proceeds, carried by the transmission network 100 but now in accordance with the executed service logic.

The introduction of the service logic has, to date, most usually been to supply number translation and alteration of charging mechanisms. Number translation comes into play when a dialled number is not the actual network destination number. For example a Freephone (0800) number is not an actual network destination number. It does though trigger SCP processing that will translate the dialled number into an actual number to be called. The service logic in this case will also change the charging mechanism in that it reverses the normal charging policy, so that the called party will receive a bill rather than the calling party.

A Service Management System 120 is used to manage trigger tables in the SSP of the switch 110, the installation of service logic in the SCP 115, and the management of data in the SDP 125.

This placement of service logic in an SCP 115 effectively takes sophistication out of transmission network switches 110. Since it is not necessary to have nearly as many SCPs 115 as there are switches 110 in the current British Public Switched Telecommunications Network (PSTN) 100, this has the advantage of greatly decreasing the number of software modules which need to be modified to deploy or enhance IN services.

Functionality in an Intelligent Network architecture can be provided from various software modules. For instance, an Intelligent Peripheral 130 might be used to provide simple resources directly to the switch 110, such as security checks on the use of Personal Identity Numbers. Another development has been provision of a Service Node 135, this itself incorporating a switch. Service Nodes 135 can provide relatively complex resource interactions.

These functional blocks of equipment, the SCP 115, SMS 120, Service Node 135 and Intelligent Peripheral 130, generally comprise computing platform 140 on which sit application 145. The applications 145 are pieces of software by means of which the computing platform 140 is controlled to provide functions, via an Applications Programming Interface (API) 150.

In practice, the service control level will be an information network in its own right and can be extremely complex. Each SCP 115 may be connected to other SCPs 115. For instance, if a service is to be provided over what is geographically a wide area, for instance internationally, it is difficult to provide the service by means of only one SCP 115. In such a case, an SCP 115 might be provided in each of several regions, for example in each country for an international service. The service data then has to be distributed to the databases of all these SCPs 115. Rather than using the transmission network 100, according to the intelligent network principle of separating service control from the transmission network 100, it will be preferred that inter-exchange (SSP-SSP) signalling should be independent of the services and should not therefore carry IN-based service-related information. Consequently, SCP-SCP communication will be needed for transfer of service-related information, for example for number translation where the original SCP 115 has no translation information.

Functionality in an IN architecture can often optionally be provided from different places in the architecture. Looking at the SCP 115 and the service node 135, the service applications 145 which dictate the services which in practice are available to a network user can be provided from either system. However, there remains the need for services to be flexible and this has resulted in service creation facilities 160 taking on considerable significance.

Known service creation techniques are based on the use of standard sets of service logic building blocks which can be brought together in different combinations to provide new or different services. These are then made available to users of the transmission network 100 usually by being compiled at the SCP 115, and managed by means of the Service Management System (SMS) 120.

In particular, a Service Creation Environment 160 may comprise a set of software tools which can be used to create service logic. The logic is then supplied to a Service Logic Execution Environment (SLEE), to create the functionality for instance at the SCP 115 or the Service Node (SN) 135.

This type of arrangement has considerably changed the communications business, at least in the telephony-based area, in that service creation is available and can be carried out not only by the software engineer but, in effect, by technically non-expert, for instance marketing, personnel. This is enabled by providing service creation facilities 160 working at a "user-friendly" graphical user interface level, for instance based on icons or simple text statements which can be pulled into flow chart representations of service "mechanisms". The flow charts are however direct representations of service logic which can then be loaded at the SCP 115.

The above describes the basic principles of service creation in known IN environments, wherein new services can be provided by pulling together standard building blocks from a portfolio of building blocks in relevant combinations.

SUMMARY OF THE INVENTION

The technical area of the present invention is complementary to this type of service creation but is more concerned with the deployment and delivery of services created, than with the creation process itself. As can be imagined from the above description of IN architectures, the complexity of services which can be made available to individual users, or to groups of users, is very great. There is an obvious need for infrastructure to support and manage service delivery, which can allow the service provider or user to take advantage of the flexibility of the developing service creation capabilities without also creating insurmountable difficulties in service management or access.

According to a first aspect of the present invention, there is provided a service delivery system, for making services available over a communications network, where one or more services selected from a group of services is made available to at least one network user, wherein said service delivery system comprises service provision functionality dedicated to said at least one user, the functionality so dedicated comprising a service directory defining the one or more selected services available to that user, and a number directory defining a virtual network dedicated to that user out of said communications network, within which the services of the service directory are available to that user.

By structuring the service provision functionality according to dedicated virtual networks carrying dedicated service sets for respective users, it becomes relatively simple to allow new services to be made available to a user.

Preferably, the service delivery system is provided with a stored array of service independent features, sometimes referred to as "Generic Service Components" (GSCs), and means for accessing the service independent features to support provision of a service from a service directory, over a virtual network within which the service is available, in response to a call instance relevant to the virtual network.

Features in this context can be defined as reusable IN components used in the construction of a service. For instance, "Call Forward" is a feature in which a new destination is always generated and is clearly an IN service feature. However, the nature of the new destination, which could be a fax mail-box or another telephone for instance, is not determined until that feature is used in building a service. Hence the feature is independent of the particular service it might be applied in.

The use of a stored array of service independent features, accessible to support services on any of the virtual networks, makes it particularly easy to add to and enhance the services which can be delivered by the system. That is, the stored array can be simply extended or amended and relevant service directories then updated when appropriate to add a service, for instance at user request. In this way, only a single set of service features needs to be changed, rather than individual sets for each user or customer record.

In embodiments of the present invention, a process for providing a service by means of a communications network, in real time, might comprise receiving an initiating call from a user which purports to initiate provision of said service, verifying availability of relevant service independent features in the context of the initiating call by reference to a user profile, and using the service delivery system to respond to said initiating call in accordance with the outcome of said verification.

Said verification and response can be carried out by means of a blackboard technique, said user profile calling on service independent features which each will register a view with the blackboard and, when triggered by that view, will process the view, plus any additional parameters, and post back resulting scenes on the blackboard so that subsequent interactions between features and the blackboard will be affected where appropriate by the preceding interaction.

Features are "insulated" from the real physical world in embodiments of the present invention by working with logical representations. Features are assigned to profiles, each profile being a data package associated with a network operator, a customer or a user, and features are triggered in a novel manner by use of the blackboard technique, being managed overall by the application of rules.

The principles of such a service creation and delivery environment can allow the network operator a high degree of control and flexibility. Surprisingly, although blackboard techniques are known in the field of artificial intelligence (AI) as being too slow to transfer to complex systems, it has been found possible in embodiments of the present invention to limit the complexity "visible" to the blackboard process in a manner which overcomes the question of speed, in spite of the potential complexity relevant to any commercially competitive communications network.

It has also been recognised in making the present invention that there can be a significant advantage in discerning between features and infrastructure in implementations. By separating features from infrastructure, communications networks, and the services available thereby, can be built to the customer's specification by only including features from a feature portfolio that are required rather than by inhibiting access to network functionality. In previous implementations, the features have in practice been so closely related to the basic network services that feature selection has affected both access to network functionality and physical architecture.

A particular advantage of embodiments of the present invention is the independence of features, germane to service provision, from physical network attributes. This means that service provision becomes decoupled from transmission technology and therefore for instance transportable from conventional to synchronous digital hierarchy (SDH)-based and asynchronous transfer mode (ATM)-based networks.

A further aspect of embodiments of the present invention is that of dynamic replaceability, allowing new features to be added for any particular user, or to a particular network, without the need to interrupt service. This is facilitated, according to embodiments of the present invention, by a mechanism relying on a Service Delivery Infrastructure (SDI) which provides the insulation of features from the complexities of the physical world mentioned above by working with logical representations of callers and stations. In particular, an SDI provides virtual networks to the user or customer by building in representations which take the form of Virtual Network Directory Numbers (VNDNs).

BRIEF DESCRIPTION OF EXEMPLARY EMBODIMENTS

An embodiment of the present invention will now be described, by way of example only, with reference to the accompanying Figures in which:

FIG. 24 shows physical node discrimination by components of the SDI;

Figure 2:
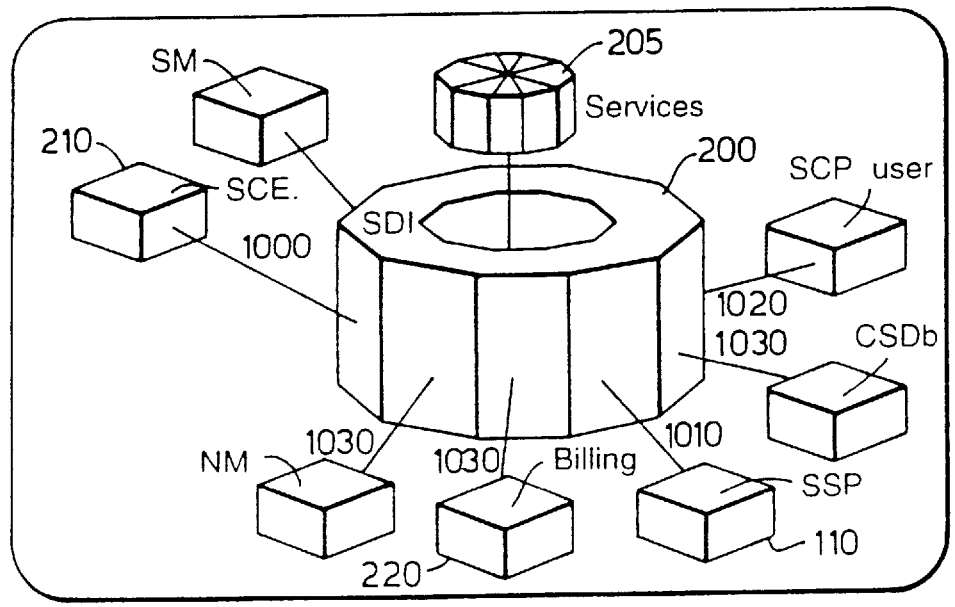
FIG. 2 shows the Service Delivery Infrastructure (SDI) in the context of external systems and IN services.

FIGS. 28 to 43 show the compositions of the following software entities within the SDI of FIG. 2:
Transaction Protocol;
Physical Network;
Physical Node;
Physical Node Directory;
Resource Allocator;
Virtual Network;
Profile;
Virtual Node Directory;
Virtual Number Directory;
Virtual Directory Number;
Virtual Network Address;
User Directory;
Service Dictionary;
Toll Ticket;
Network Interconnect;
Virtual Node; and FIGS. 44 to 48 show schematic flow diagrams for the following operations on or using the SDI:
service creation;
virtual network provisioning;
physical network/network interconnect provisioning;
service (instance) provisioning;
processing an incoming call.

DETAILED DESCRIPTION OF EXEMPLARY EMBODIMENTS

It might be useful to note in the following description that "virtual network" is a term used to describe a network effectively dedicated to use of a single customer, such as an international corporate entity, which appears to the user much as a private network would have appeared in the past, defined in dedicated hardware, but which is defined from a greater transmission capability usually simply by software. That is, the virtual network is only limited, for instance in geographical layout and in capacity, by a software specification, in accordance with the requirements of the customer, which specification allocates resources from a transmission network.

For instance, a network provider may have installed international voice and data carrying highways, interconnected by switches so that voice and data can be routed appropriately, which carry multiplexed traffic for multiple customers, each customer however only being able to access traffic which originates and terminates at their own Customer Premises Equipment (CPE).

In embodiments of the present invention, each customer can not only choose to change the physical capacity available to them by means of a virtual network but can also, independently, choose to change the service portfolio available to them. For instance, a customer might already have available "time-of-day routing", in which incoming calls can be automatically rerouted after a particular time such as close of business away from individuals' offices to a number providing a recorded message. They might then decide they also need authorisation of outgoing calls to international destinations.

In the following, object oriented software engineering terminology is used. In object oriented software systems, data and functionality are brought closely together in representations of real-world entities. The real-world entity may be an article or a process for instance, an organisation or a booking procedure, but every real-world entity can be represented in the software system as an "object", that is a combination of data relating to the real-world entity, encapsulated in process-related software for accessing that data. The software implementing an object can thus be described as data structures together with operations that express the behaviour of the object, and the entity represented by the object is any thing, real or abstract, which one can describe in data plus operations to manipulate the data.

SDI Internal Architecture

Figure 8:
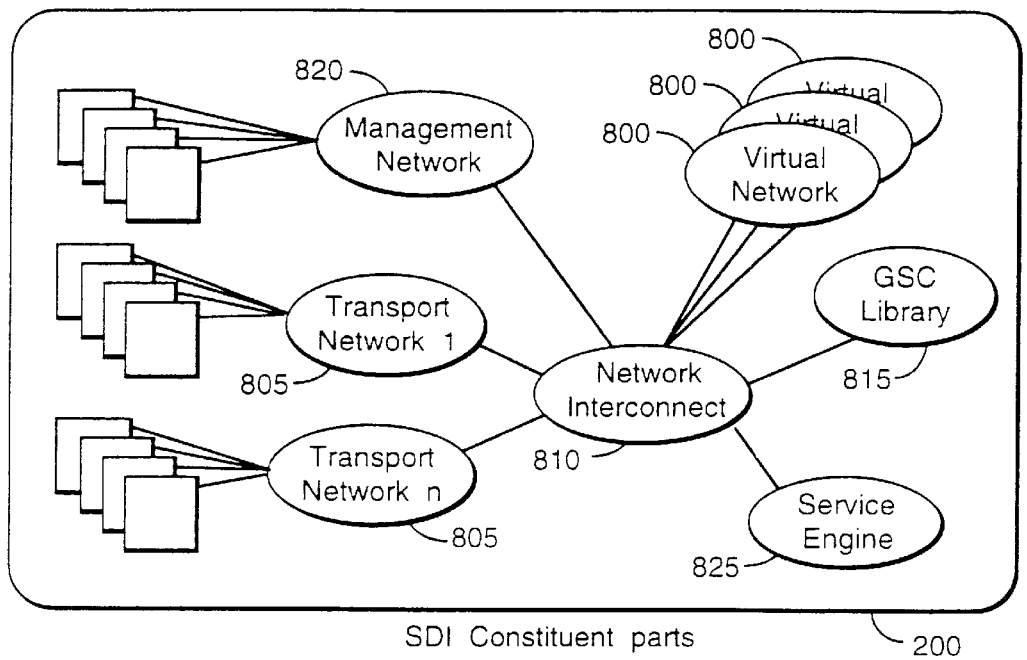
FIG. 8 shows the internal architecture of the SDI of FIG. 2.

Referring to FIG. 8, overall the architecture of the SDI 200 itself is structured as follows:

i) an array of virtual networks 800;
ii) one or more transmission (transport) network objects 805;
iii) a network interconnect object 810;
iv) a library 815 of service independent features (or generic service components);
v) one or more network operator's management network objects 820; and
vi) a service engine 825.

This effectively provides the following:

virtual Encapsulation of physical transport networks;
provision of customised communities of users and IN services over these abstracted transport networks—multiple virtual networks;
logical de-coupling of the overlay of Virtual Networks onto Transport Networks;
provision of libraries of Generic Service Components which can be utilised to dynamically create new IN services;
provision of a new interpretive program upon which these services execute;
provision of a virtual encapsulation of management and support systems;
IN services within a virtual network can be provided on one or more transport networks where transport networks can be different telecommunications networks;
provision of a commonly owned program interface to all components of the framework.

Transport Network Abstraction 805

The SDI transport network abstraction provides a virtual encapsulation in software of the topology of a physical network and of the networks elements' capabilities, protocols and call models. It manages the resources involved in a particular call within that particular network.

As new elements would appear in the transport network, to be utilised by virtual networks or IN services, then new encapsulations of those elements would be brought into the appropriate transport network abstraction.

Each network element encapsulation supports the common BT-owned interface into the SDI.

Management Network 820

This component exhibits much the same encapsulation principles as the Transport Network but is more specifically representative of non-call processing entities such as credit bureaux, billing systems and other operational support systems. It provides virtual encapsulation of each particular system interface and protocol and offers a common interface into other SDI components.

Virtual Network 800

This is the powerful innovative technique of providing communities of users as a Virtual Network. The community specification is arbitrary and may be a complete telecommunications company, a corporate network or a group of disparate physical stations from one or more telecommunications networks.

The services available on a particular VN are defined within the scope of that VN. They are created using a BT-created syntax which identifies the components and running order of components in the Generic Service Components Library.

Users on a VN have specific identities and are configured, through service creation tools, to have access to particular configured instances of one or more of the available IN services.

The instances of the services are deployed and configurable using service creation tools accessible from numerous interfaces such as human, telephony or operator assisted.

Network Interconnect 810

This provides BT with the highly configurable robustness to provide a logical association to determine which nodes/stations in the set of available transport networks constitute a virtual network.

This enables dynamic reconfiguration of the underlying physical implementation of virtual network by the virtual network provider without the need to change the Virtual Network itself. Reasons for such change could be numerous examples being network outages, change of network provider, etc.

Service Engine 825

This is an innovative interpretive virtual processor upon which services execute. It relies on a "blackboard" software processing technique with limited feature sets to keep processing times within acceptable limits for real time operation.

Generic Service Component Library 815

This is the library of components created and deployed as part of the service creation process that are available to be used for IN services.

Any IN service within a VN 800 is specified in terms of these GSCs.

Overall, an SDI 200 according to an embodiment of the present invention employs a number of innovative abstraction approaches to the delivery of IN services that, combined, exhibit an adroit capability to provide IN services within and across networks for a wide range of applications.

1. REQUIREMENTS FOR SDI

Referring to FIG. 2, the SDI 200 is required to be a real-time, IN element, software environment. It is intended that the interfaces with external elements are encapsulated and presented to the services 205 in a consistent logical manner.

1.1 System Architecture

Figure 1:
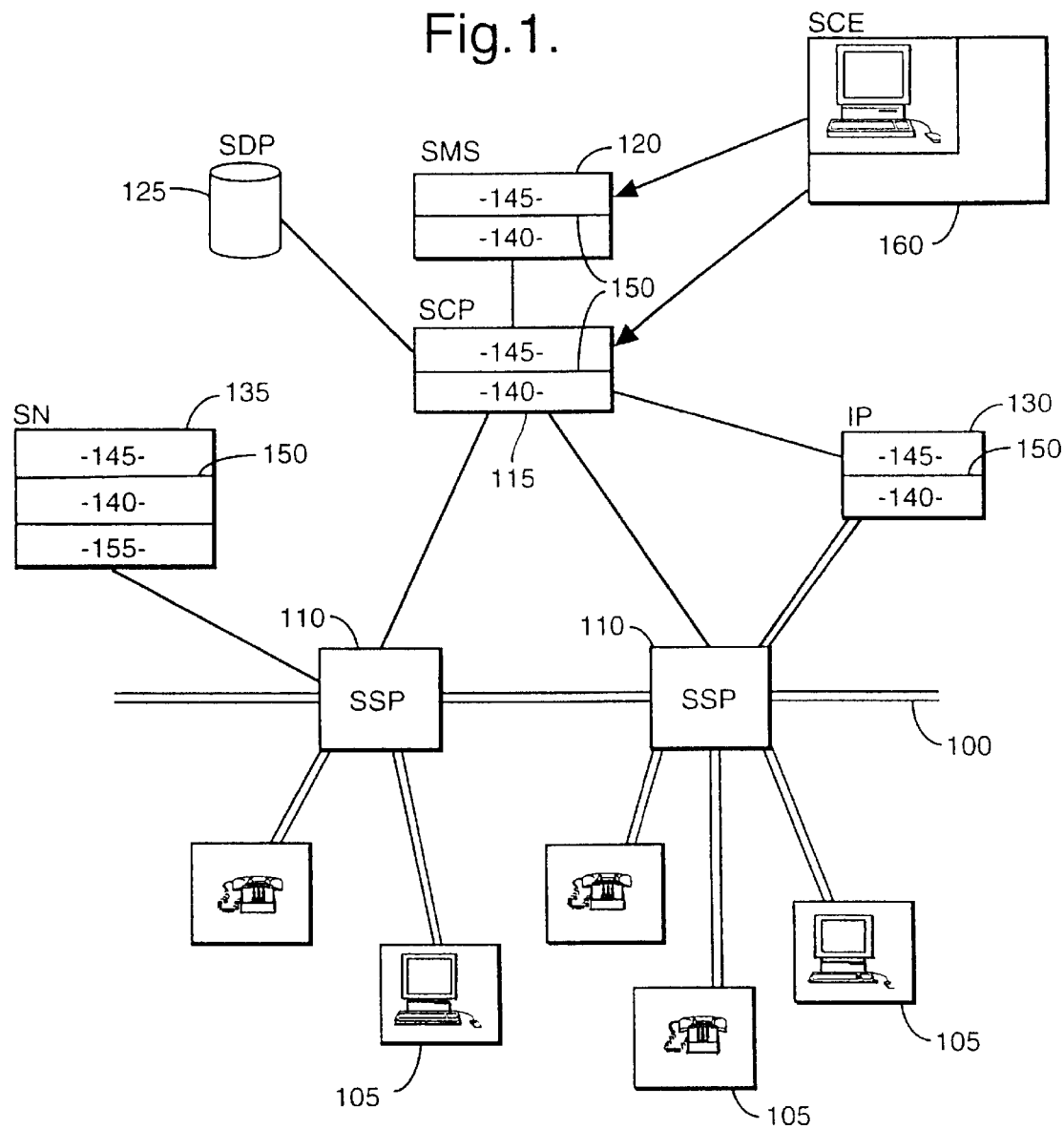
FIG. 1 shows, as mentioned above, a basic model of an intelligent network according to known network architectures.

Referring to FIGS. 1 and 2, the SDI 200 resides on an Intelligent Network Element (e.g. SCP 115 or SN 135) which is within the ambit of a Service Creation Environment (SCE) 115. The SDI 200 and the applications running under its auspices provide the call processing part of an IN service.

The SDI 200 has transmission network interfaces 1010, primarily to the SSP 110, a service creation interface 1000, operations and management interfaces 1030 and a human/machine interface 1020 for a network operator user.

The SDI 200 supports the establishment of multiple, discrete, service-less virtual networks to which services can be added. The SDI provides the basic service framework under which IN services operate, presenting common interfaces to management and billing systems.

Each discrete virtual network 800 of the SDI 200 should be configurable in terms of the services available on it, the users on it and the services available to each user. A virtual network can represent any classification of users, e.g. a corporate network or a particular subset of the public network.

The SDI receives all provisioning information through a provisioning interface, for instance from other systems in the SCE 210.

1.1.1 Performance & Dimensioning

A limited number, for instance one hundred and fifty, of virtual networks 800 may be defined. The number of users in each network may be configured but the total number of users for all networks will be limited, for instance to 2,000,000. The SDI software downtime should also be limited, for instance to not more than 3 minutes in any one year.

For all services on the networks and services supported by the SDI, a reasonable target of calls handles per second in the busy hour might be 160 (576,000 BHCA). The response time to call messages received should be less than for instance 100 milliseconds for 98% for all messages at 80% loading. Full loading is considered to be the product of the average number of messages per call and the maximum number of busy hour call attempts.

1.1.2 Software Engineering

The SDI needs to be a real time application. The SDI and its interfaces have been developed using Object Oriented technology. The development needs to be portable and implemented by a set of re-usable modules. A suitable target platform might be based on Stratus hardware.

1.1.3 Use and Usage Requirements

The SDI 200 can co-exist on the SCP or SN SLEE. In the following, it is described as being on the SN SLEE. The SDI design endeavours to re-use components of the SN SLEE where encapsulation makes engineering sense and offers acceptable delivery time-scales.

SDI software upgrades need to be backward compatible, where the operating systems permit. By designing components to be dynamically replaceable, and other appropriate design principles, SDI upgrades need cause only short disruption to service, for instance of no more than one minute (where no operating system of third party product is involved). It should be possible to roll-back out of upgrades to SDI components.

1.2 Types of Network

Figure 3:
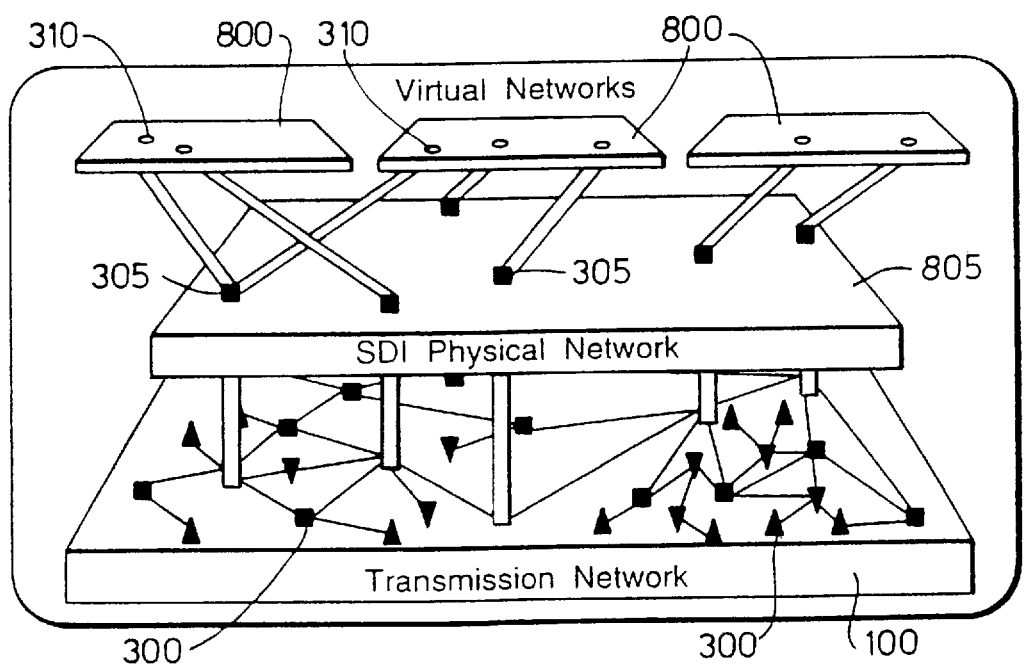
FIG. 3 shows a schematic representation of networks, real and logical, supporting the SDI of FIG. 2.

Referring to FIGS. 3 and 8, in the following description of the present embodiment, there is one physical transmission network 100, which carries e.g voice traffic upon which logical (virtual) networks 800 are constructed. The physical transmission network 100 can be considered to comprise all the physical elements that make up the totality of the telecommunications network from transmission equipment, switches, cross-connect points etc.

Each virtual network 800 of the SDI 200 needs some logical means of addressing physical nodes 300 within the transmission network 100 to which its users are connected. Services are then built on the concept of virtual network directory numbers and users, rather than transmission network directory numbers and users in the transmission network context.

The establishment and management of the transmission network 100 is handled in the network operations, planning and management domain of the network operator's business. The provision of virtual network directory numbers is a step towards insulating the virtual network from the physical network topology. (There is further discussion of this area later in this specification.)

If the physical nodes 300 are to be addressed, the physical name of the particular nodes needs to be declared to the SDI 200. This physical information is localised within the SDI 200 as an SDI "Physical (or Transport) Network" 805. This is effectively then a projection of a small proportion of the transmission network 100, in the SDI 200, supporting the virtual (or "service") networks 800. Each virtual network 800 has associated with it only the nodes 300 in the transmission network 100 required to connect users to that network.

Referring to FIG. 3, the SDI Physical Network 805 also provides a logical representation of network capabilities. Virtual Networks 800 then logically group SDI Physical Network nodes 305 together with services. Virtual networks 800 provide services to Customers. Each customer has only the top-level view—a dedicated virtual network 800 of services.

Based on the above, the following passages are:

Section 1.3: "SDI Physical Network" 805—covers the requirements of representing the part of the Transmission network that is required to deliver IN services.

Section 1.4: "Virtual Networks" 800—covers the requirements of virtual networks 800, their establishment and configuration. This section deals also with services in the context of the SDI 200 and how they are added.

Section 1.5: "Networks Interconnection"—addresses the linking of the many virtual networks 300 to the transmission network 100 and determination of the appropriate network to handle calls.

Section 1.6 through Section 1.10—addresses requirements that span all of the application such as time, statistics, persistence and control.

1.3 SDI Physical Network 805

The topology of a physical network 805 is independent of a logical virtual network 800 provided over it, provided the capabilities of a particular node 300 are promulgated to a virtual network 800; e.g. a service needs to know if a station on a node 300 is capable of accepting a text string for caller name delivery. The physical network 805 of the SDI 200 is the knowledge of those points to which it interfaces in the transmission network 100.

The SDI physical network 805 should isolate and uncouple vendor specific detail with respect to the transmission network 100 from virtual networks 800 and from each other. The interface presented to all virtual networks 800 from the physical network 805 should be consistent.

Figure 4:
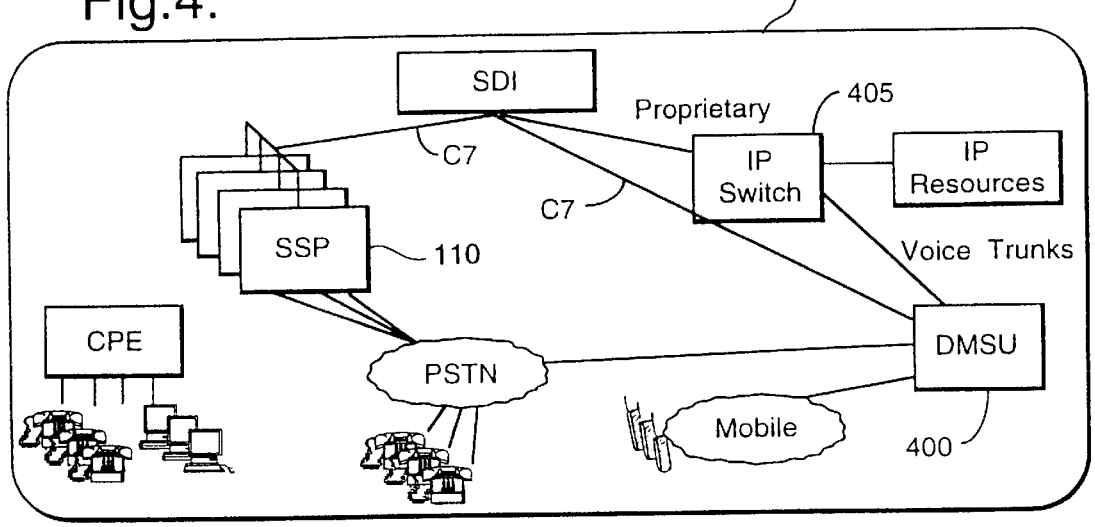
FIG. 4 shows the context of the SDI of FIG. 2 amongst actual systems of a transmission network.

The SDI physical network 805 can be extended as required. Referring to FIG. 4, nodes of the transmission network 100 of the current British PSTN which might be identified for inclusion in the SDI physical network 805 are the Digital Main Switching Units 400 (DMSUs), the SN Switch 405 (through the Service Node SLEE interface) and the SSP 110.

Through suitable encapsulation, knowledge of the underlying transmission network 100 is not required by a service in order to operate. This allows services to be independent of aspects such as signalling protocols, call models, modification to the transmission network 100 and the physical access mechanisms offered by the physical network 805. A service can ascertain some limited physical attributes of a station e.g. display capabilities for caller name display.

Physical elements to which the SDI 200 must interface are represented by objects in the SDI 200. It is possible to have any number of instances of an element type, e.g. there are a number of instances of SSPs representing the N actual SSPs declared to the SDI 200. Encapsulation of physical elements (objects) can be created, modified, and deleted as required to reflect the physical transmission network 100.

An encapsulation (object) is a reflection of an actual physical element in software. This extends to the behaviour and state of an element that is required for the SDI 200 to inter-operate with it. E.g. for an SSP 110 this would include the call model, the signalling protocol and trunk configuration. An object is provisioned with the state information of the actual element. For an SSP 110, it will reflect the SSP-identity and all virtual trunk identities as configured by network operations. Each object will be addressable and state information is provisioned and modified through a provisioning interface.

Figure 5:
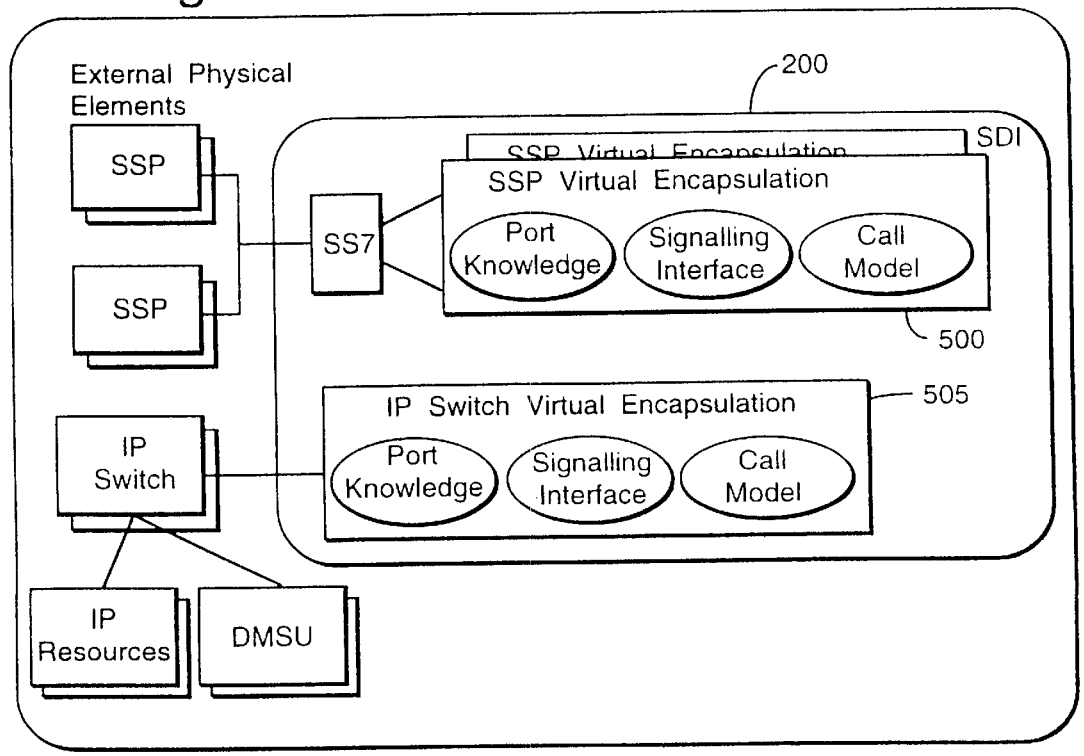
FIG. 5 shows elements of a transmission network as viewed by the SDI of FIG. 2.

Referring to FIG. 5, to the SDI 200 the objects are effectively the actual entities. By the management of control state information, it is possible to take an object 500, 505 (and, as far as SDI is concerned, the actual entity) temporarily out of operation and to restore it to operation. Newly created objects are out of operation until explicitly brought into service. Additions and updates to the SDI physical network 805 can be reflected in the SDI 200 by the deployment of a new object for the element concerned, produced by the SCE 210.

1.3.1 Physical Node & Physical Node Address

Network elements in the transmission network 100, which carry calls, generally carry calls over trunks. The elements and their trunks are addressable and are usually connected to other nodes on the transmission network 100. Consequently, to the SDI 200 a physical node 300 shall be a trunk identity on a particular network element. Nodes of the SDI physical networks 805 have the attribute of being dedicated or common, a "dedicated" physical node being understood to be a permanent connection carrying calls for a particular virtual network 800. A "common" physical node might carry calls for more than one virtual network 800. The common or dedicated attribute of a physical node is changeable.

Nodes 305 of the SDI physical network 805 having an identity by which they are addressed for provisioning. SDI physical nodes 305 are provisioned through a provisioning Interface. They may be created, deleted or modified for a particular virtual encapsulation of a physical element. An SDI physical node 305 may exhibit a state of enabled or disabled, reflecting the condition of a transmission network node 300. In the disabled state, the SDI 200 will not accept or place calls from or to it.

1.3.1.1 Physical Node Address

The physical node 300 that a call originates from or is directed to is identified, for call processing purposes, by a physical node address. All physical nodes 300 have a physical node address. The physical node address and the physical node identity are not the same thing.

For dedicated physical nodes of the SDI physical network 805, the physical node address comprises the physical element identity and trunk identity.

Common physical nodes carry calls switched over other networks—there is no guarantee that two calls from the same station always arrive or leave on the same common physical node. Therefore, the physical element identity and trunk identity is not part of the physical network address for common physical nodes. For common physical nodes, the physical node address comprises, either or both, the calling line identity and the dialled number. The physical node address for a common physical node may contain anything that may be dialled from a Dual Tone Multi Frequency (DTMF) keypad, including * and #. Table 1 shows the construction of the physical node address.

TABLE 1

| | Physical Node Address | | | | | | | |
|---|---|---|---|---|---|---|---|---|
| | Inbound | | | | Outbound | | | |
| Physical Node Type | Physical Element Identity | Virtual Trunk Identity | Calling Line Identity | Dialled Number | Physical Element Identity | Virtual Trunk Identity | Calling Line Identity | Dialled Number |
| Dedicated | ✓ | ✓ | x | x | ✓ | ✓ | x | x |
| Common | x | x | ✓ Either or both ✓ | | ✓ | x | x | x |

✓ = Will be present & meaningful:
x = will not be present or present and not meaningful.

1.3.2 Physical Network Address

Figure 6:
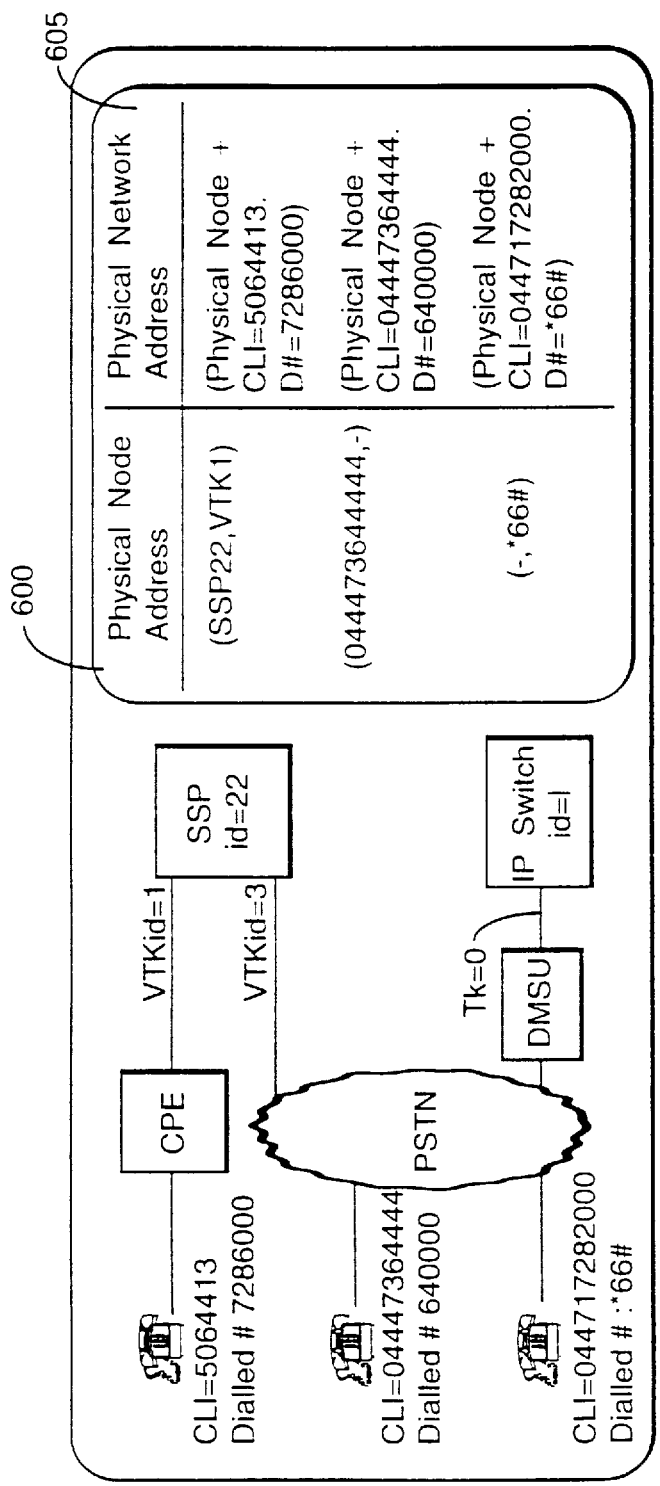
FIG. 6 shows a relationship between node addresses and network addresses in a physical network of the SDI of FIG. 2.

A node 305 of the physical network 805 will, generally, only identify a group of possible network users. It should be possible to identify and address users uniquely on a particular node. A physical network address uniquely identifies an access or termination on the physical network 805. The physical network address comprises a physical node address and an identifying number. What the identifying number may be varies depending on circumstance as shown in Table 1. The schematic in FIG. 6 shows examples of physical node address 600 and related physical network address 605.

1.3.3 Operations on the Physical Network

Figure 29:
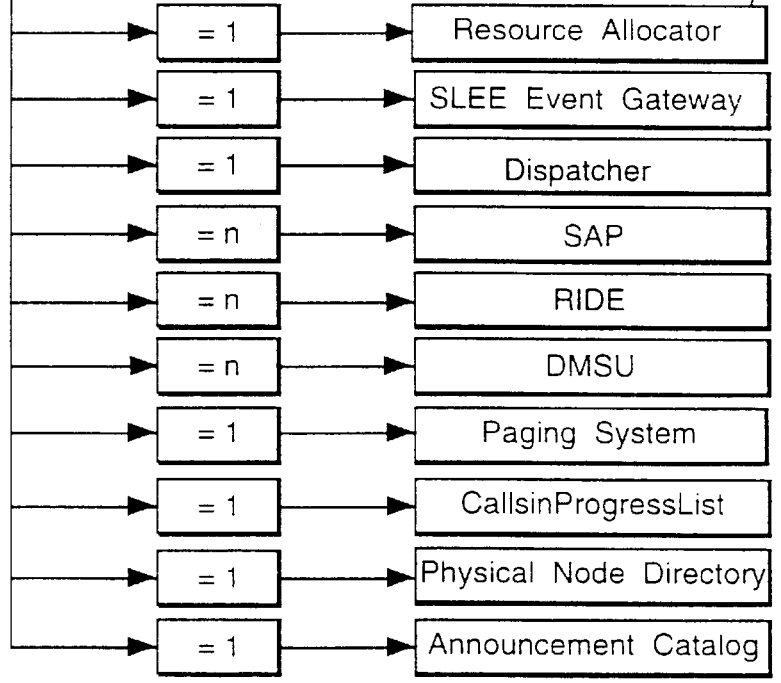

The composition of the physical network 805 is shown in FIG. 29.

As an encapsulation of the real world for virtual networks and services, the SDI physical network 805 must provide a set of operations to allow interaction with resources and users connected to the physical network. This set of operations on the physical network 805 must satisfy the required operations of the service interface. The operations the physical network 805 must offer are detailed in the following paragraphs.

The physical network 805 manipulates the legs of a dialog (call) with respect to the physical elements of the transmission network 100 as requested. It offers a standard set of operations and localizes any specialized knowledge of individual transmission network elements. Physical network operations enable legs to be created and deleted. If a leg is deleted which is the only leg within a dialog then the call is cleared and the dialog is ended. It is possible to specify an announcement to be played immediately prior to the deletion of a leg to advise the end user. Legs within a dialog can be connected using a connect operation which will connect the specified legs within a dialog together.

The playing of announcements differs across physical elements of the transmission network 100 both in terms of how announcements are actually played and how they are individually addressed. This level of detail is localized in the physical network 805, which determines which element an announcement resides on and how it is connected to the specified leg. The physical network 805 accepts a play announcement instruction with a specified announcement identity and a leg within a dialog to connect the announcement to.

It is necessary to be able to collect digits from a leg of a dialog. Again how the actual detail of how this is achieved is localized within the physical network 805. The physical network 805 accepts an instruction to collect digits for a specified leg within a dialog. An announcement identity may be provided as a prompt to be played to the user.

A dialog can be ended in its entirety by using an "end dialog" operation on the physical network 805. This causes the dialog to be closed and the network resources that may be involved to be released.

1.3.4 Physical Network Resource Allocator

The knowledge of the presence and capabilities of the physical network elements is isolated from the services. Consequently, a service does not request a particular element to perform an action, merely that the action be performed, e.g. play announcement. How the announcement is played requires that a decision is made based on the knowledge of the capabilities of the physical element currently involved, what other physical elements are capable of performing particular actions and which ones may work together. This is the responsibility of the physical network resource allocator. The resource allocator must ensure that the legs involved in a call across elements are maintained.

Figure 7:
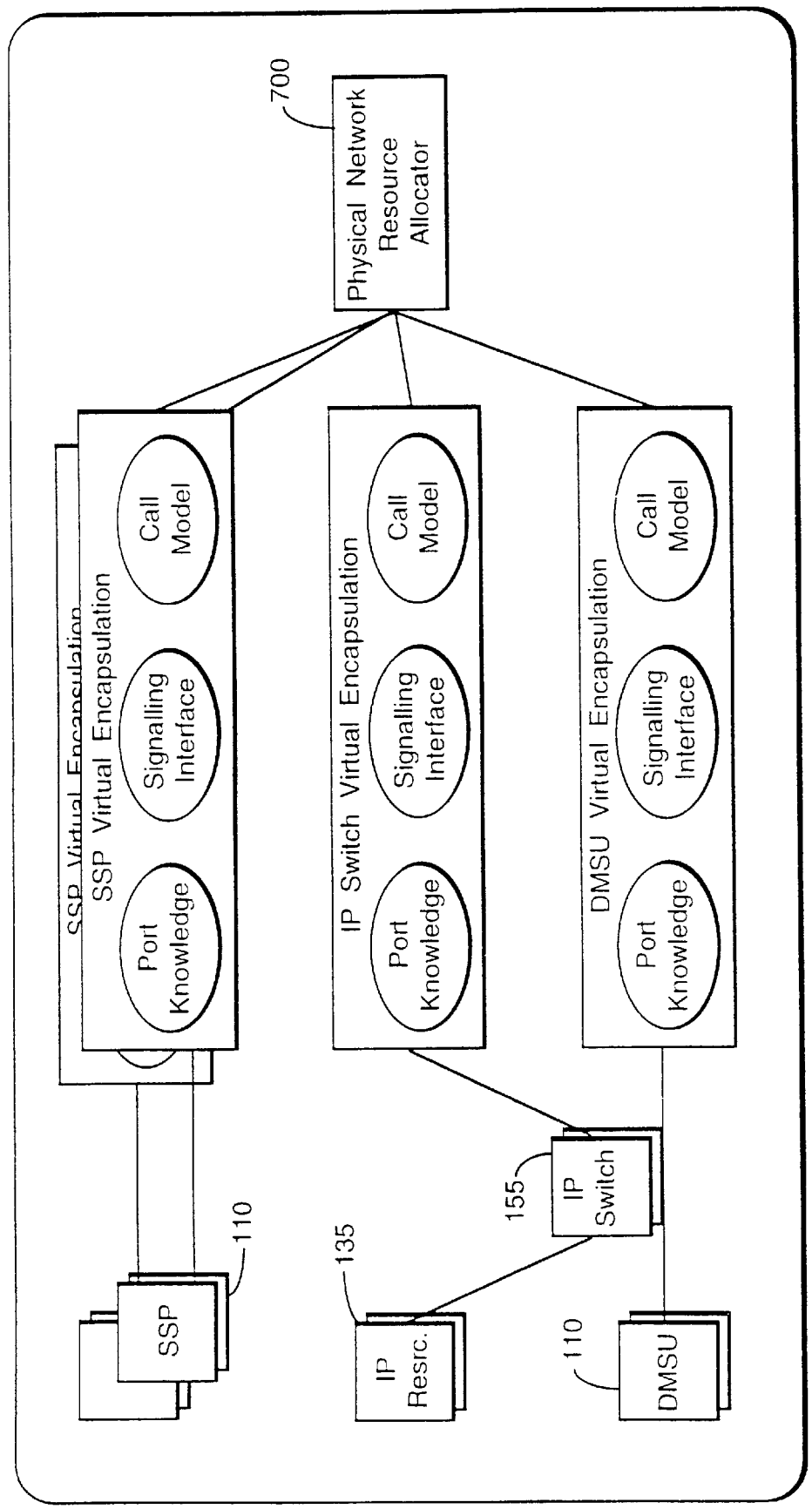
FIG. 7 shows resource arbitration in a physical network of the SDI of FIG. 2.

The schematic in FIG. 7 represents this graphically. For any operations requested of the physical network 805 the allocator 700 shall determine the resultant operations on appropriate virtual encapsulations.

1.3.5 Physical Network Access

All networks have users. Users exist in the physical domain. Physical network access is understood as the means whereby a user connected to the transmission network 100 is conveyed to the SDI physical network 805.

There are two modes of access to the SDI physical network 805—dedicated and switched access. Dedicated access is defined as the case where calls arrive over a trunk that is a dedicated connection between an encapsulated network element and customer CPE. Switched access is defined as the case where calls are switched through the physical transmission network 100 and arrive at an encapsulated physical element over a common trunk.

All accesses arrive at the SDI 200 with enough information to form the physical node address. It is possible to determine the country and/or area of origin from the physical node address and the calling line identity (CLI).

An access shall be rejected if any of the following are asserted:

the virtual encapsulation is in a disabled state;

the physical node address is not known;

the physical node is not in an enabled state;

A rejected access shall be connected to an announcement stating that access has failed, played in the SDI pre-selected default language. A rejected access is logged in the SDI Log.

1.3.5.1 Dedicated Access

Dedicated access is possible on dedicated access lines associated with a particular physical node i.e. an SSP trunk. The physical node exhibits the attribute of being dedicated; it is by this attribute that an access from that node is recognised as a dedicated access type.

1.3.5.2 Switched Access

Access from a PSTN or over networks of other network carriers is possible. Switched access calls arrive at a physical node exhibiting the attribute of common and by merit of this are recognised as the access type "switched". Calls originated from the same station, using switched access, do not always arrive at the same physical node.

A call arrives at an SDI common physical node because an access number is interpreted by the carrier as identifying the call as an IN call to be carried by the network operator having the SDI 200. This access number may be either the number dialled by the user or the calling line identity of the originating station. For switched access the physical node address is the access number.

1.3.5.3 Travellers Access

A traveller is a concept only understood within a service and not to the SDI. To the SDI 200 it is merely switched access. A service must deduce that an access is "traveller" and process the call based on what a traveller means within that service.

1.3.6 IP Switch Behaviour

An Intelligent Peripheral (IP) Switch may be used to connect voice trunks to IP resources, e.g. the Speech Applications Processor (SAP). The connection of resources to a particular voice trunk is controlled by the SDI 200 depending on what action the service is requesting.

In the UK PSTN, an IP or SN switch may have up to sixteen 30 channel voice trunks to a DMSU. Calls are set up to the voice trunks by a C7 NUP Dialog between the DMSU and the service node. The switch and its resources are accessed by use of the service node SLEE API.

1.4 Virtual Networks

The concept of bringing together remote hubs of a telecom network as one integrated network is proven in many large corporate voice and data networks. Linking remote systems requires a transmission network; either to be built or bought. The net effect is the appearance of a single, dedicated network of users. Each dedicated virtual network offers particular capabilities based on what physical elements are available within it, and, extending to the IN domain, what IN services are available to it. The addresses of locations within a virtual network are logical representations and are translations from other logical representations of physical addresses. This address translation provides the power to separate virtual networks from physical networks.

A virtual network can be viewed in the same way as any other network, the main difference being that a virtual network is unaware of its physical construction. It can be viewed like a cloud, through which there is always a route from point A to point B but only the transmission network knows what it is—it may be dynamically changing. The connection routes are transparent (i.e. not known) to users.

A virtual network has people that use it—users. They use some form of station on the network, e.g. a phone, a terminal etc. The stations are connected to a node, e.g. a private PBX, a termination point in the public telephony network, a channel in the cellular network etc. Nodes are located at sites. The virtual network in this context and in the context of embodiments of the present invention is the interconnection between these nodes. A virtual network 800 is configured to have services. A service is a particular communications capability, e.g. Plain Old Telephony Service (POTS), Voice Mail, etc.

Each virtual network 800 has a numbering plan defining what it allows as directory numbers for its users and stations. The definition of a network specific numbering plan gives the virtual network concept the power to represent practically any type of network. The associations of users and directory numbers is maintained within a virtual network user directory. What part of the "world" a user is in is maintained in an atlas, where world means whatever is perceived by the administrator of the virtual network. Users have some or all services available to them; the services a user has is maintained in a user profile.

As provider of virtual networks, a carrier or network operator will create, enable, modify, disable and delete them. Each virtual network has a unique virtual network identity. Customers are able to, when allowed by the network operator, modify some aspects of the virtual network.

1.4.1 Virtual Node & Virtual Node Address

All virtual networks have nodes to which stations are connected. From within the virtual network a node is an end point e.g. a local PBX or phone jack. (As opposed to the physical network perspective which describes the actual trunk or line). Thus the same node is known by a physical node name and a logical virtual node name. This decouples knowledge of the physical network configuration from the virtual network. An association must be maintained but the virtual network only needs to know about its own virtual nodes.

Each virtual node in a virtual network 800 has a name. The virtual node name is unique within the virtual network. Every virtual node name has a virtual network address which is unique within a virtual network. Virtual nodes and their addresses are defined further, later in this specification.

1.4.1.1 Gateway Nodes

A particular type of a virtual node is the gateway node which carries cells off the virtual network 800 to another network (public network or virtual network). Gateway nodes behave as any other virtual node.

1.4.1.2 Sites

A site is the place where a node is located. A site is synonymous with virtual node. No distinction is made between site and virtual node.

1.4.2 Virtual Network Address

There may be one or many stations connected to a virtual node. It is necessary to be able to identify a particular station. A virtual network address uniquely identifies a station on the virtual network and comprises a virtual node address and a station number. Every station on the network has a virtual network address.

1.4.3 Virtual Network Numbering Plan

Every virtual network has a numbering plan which defines valid directory numbers, dialling procedures (prefixes, etc.) and the maximum length of numbers. Prefixes may be defined to indicate out of plan numbers. The numbering plan may be divided into any number of ranges or cells, up to maximum number length—1. A numbering plan only describes virtual network directory numbers, not where they terminate or what they translate to.

The number of entries in a numbering plan (or sub-part of it) is limited by the number of digits available and the definition of what a valid directory number is.

Numbering plans support vanity numbers, i.e. numbers that spell words using a commonly accepted alpha—number mapping.

The numbering plan is able to encapsulate numbers from other numbering plans e.g. public numbers enabling on-net stations to have off-net type numbers.

1.4.4 Directory Numbers

A directory number is a virtual network number. The identity of a user on the virtual network is his/her directory number (DN). The directory number for a user may be determined from the station he uses or by explicit identification through an authorisation code and personal identification number. A DN is unique within a virtual network. Every station on a virtual network has a Directory Number. A DN identifies the virtual network to which it belongs. Directory numbers can be of variable length up to the maximum length defined in the numbering plan. Directory Numbers may overlap. e.g. 12345 and 123456 are both legal. A directory number is a logical entity and is independent of a particular node or service on the network.

The virtual network administrator is able to add, enable, disable and delete directory numbers.

1.4.4.1 Associations of DNs: The Virtual Network Atlas

A virtual network may be global, national or local and an administrator may need to define the world of that virtual network, which may or may not be the same as established political or national boundaries. The location of a virtual network directory number in the world of that virtual network is the virtual network atlas. The atlas permits a virtual network administrator to define associations of DNs.

These associations may describe any relationship e.g. originating geographic area, special interest groups, etc. There is no limit to the number of directory numbers that may be grouped together. There is no limit to the number of associations that may be established. Services determine what association a directory number belongs to. A directory number may only appear in one association.

The virtual network administrator is able to create, modify and delete associations of DNs.

1.4.5 Virtual Network Number Directory

The DN is defined as a logical, unique identity of a station on the virtual network. Generally, in telephony, a user is associated with a particular station, and when a user's DN is dialled, the caller would expect that user's station to "ring". (Of course, which DN is targeted and, consequently, which station actually rings is the responsibility of a service.)

Stations are connected to nodes and, as the earlier discussion on Virtual Network Address (Section 1.4.2) defined, are addressed by a virtual network address. It will, therefore, be necessary to associate a particular virtual network address with a particular directory number.

There is a directory of associations of virtual network addresses to DNs, i.e. a virtual network number directory. An entry in this directory is a virtual network address—directory number pair. There is one of these directories for a virtual network.

Where an entry is in the directory, it is possible to obtain from it, one, and only one, DN for a particular virtual network address. Similarly, it is possible to obtain, one, and only one, virtual network address for a particular DN. A DN may be marked in the directory as enabled or disabled.

A virtual network administrator is able to add, enable, disable, modify and delete directory entries. It is possible to view directory entries on a particular virtual node.

1.4.6 Users & Stations

A person (or otherwise) that has legitimate access to a network is a user of that network. A user has a name, some form of identity, and other attributes that describe him. A user uses a station to interact with the network, and would, generally, have a normal (default) station. In line with the earlier discussion on virtual networks (Section 1.4 on Page 20), a station is an origination or termination point connected to a node on the network.

To other users, a user has an identity on the network—say, a directory number, and, by this identity he is recognised and other users on the network can address him. Further, in conventional telephony, it is the station that has the directory number and the actual user is inferred from the directory number.

A user may wish to access his service from a station other than his own (provided the service enables him to do this). In this case, his identity cannot be inferred and must be inquired. The user needs to identify himself to the network, e.g. by means of an authorisation code (e.g. a calling card number) and a personal identification number. The circumstances when identification is required are governed by services.

Generally, a user's station has a default service, e.g. a PBX line usually provides dial tone for voice service as opposed to, say, voice mail service. Consequently, therefore, it can be said that the directory number of a station is associated with a user and with a particular service that the user has. Thus, a station is described by, and to a user is synonymous with, a directory number.

Every user is described by a user profile containing information about the individual and which directory numbers that a user has. Each directory number identifies a service profile which is the capabilities of a particular service for that user. Unless a service determines otherwise, the user is identified from the directory number of the station.

The virtual network administrator will add, modify and delete the profiles describing users. A user profile exhibits a state of enabled or disabled which is set by the virtual network administrator.

4.4.7 User Profiles

It is necessary to hold certain information about a user, within the SDI 200, that is required across many services. The information, considered to be non-service specific, that is held per user is:

User name, an ASCII text string of up to 50 characters.

A user identity, an ASCII key of up to 20 characters.

An authorisation code and PIN, a digit string up to 20 characters (including PIN).

Authorisation status; one of enabled, blocked or disabled.

Network operator Account number, a digit string up to <?> characters.

Network operator Calling Card number, a digit string up to <?> characters.

Customer Type Identifier, a single digit identifier "B" (business) or "P" (personal).

User state, a single digit identifier describing a state of enabled or disabled.

A Directory number keyed list of schedules of services.

Figure 9:
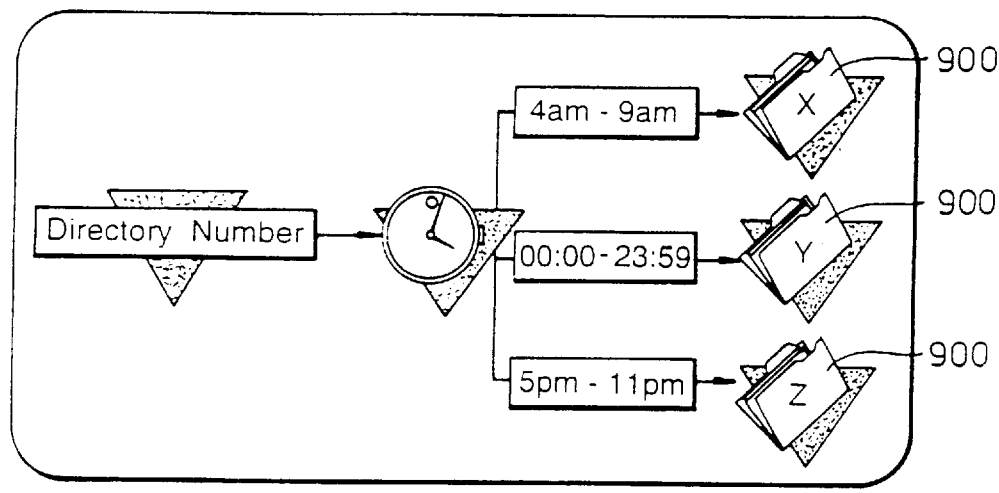
FIG. 9 shows a graphical representation of scheduling of a directory number.

User profiles are addressable by the user identity, authorisation code or by one of the directory numbers that a user possesses. User profiles are persistent. Each DN that a user has within his profile has a schedule. The DN schedule identifies a particular service profile for a particular time of day. Referring to FIG. 9, one service profile 900 is always identified.

The service profile description associated with a DN contains:

A time expression detailing the time that this service profile is active.

A default service profile indicator, marking a profile as the default for this DN.

A service profile identifier referencing the actual service profile.

A service identifier indicating the name of the service the service profile describes.

The service profile referenced does not have to be exclusive to this DN and may be used by any number of other DNs, provided the service itself is shareable (this is the decision of those provisioning. The SDI 200 does not provide any form of logic checking on the sharing of service profiles 900).

Once a user profile exists it is not possible to modify the user id, all other components may be changed.

The virtual network administrator is able to create and delete user profiles. User profiles may only be deleted when the directory number list is empty. User profiles are modifiable by a virtual network administrator. A user may modify the authorisation code and PIN.

1.4.8 User Directory

Every user on a virtual network has a user profile within that virtual network. User profiles are held within a user directory. It is possible to locate one, and only one, user profile in the user directory using the following individual keys:

User identity.

Authorisation code.

Directory number.

Thus, for a given DN it is possible to obtain, from a user profile, a service name and a service profile identifier (and, indeed, any other information in a user profile).

User profiles may be added to, replaced within and deleted from the user directory by the virtual network administrator.

1.4.9 Virtual Network Services

This section briefly addresses two areas for the sake of clarity and completeness. Firstly, it relates concepts and processes of an IN Architecture and a service creation process. Secondly, and more pertinently, the section details the requirements describing how services are to be deployed within the SDI 200. This includes the delivery of a service to the Intelligent Network Element and the activation of a service within the domain of a virtual network.

It might be noted that a service creation architecture suitable for use with the SDI is described in the present applicant's co-pending European patent application number 94302848.0, filed on 21 Apr., 1994, the subject matter disclosed therein being incorporated herein by reference. Other service creation architectures or environments could however be substituted.

It might also be noted that an IN architecture is not essential to support embodiments of the present invention. It is, though, important to design in suitable interfaces for the SDI 200.

A service, within the context of the intelligent network element, is a specific logical set of telecommunication capabilities that have been packaged and made available to be deployed on a virtual network, e.g. voice services, voice mail, fax store & forward etc. A service is accessed by a user through his virtual network.

Services are separately developed entities to which the SDI 200 interfaces. A virtual network 800 supports more than one service.

The IN Architecture and various SCE requirements rely on reusable software components which are not specific to any one service and which are used as the parts from which services are assembled. Referring to the above-mentioned co-pending application, these components have been termed Generic Service Components (GSCs). GSCs are developed, tested and released by engineers using an SCE tool-set and test harnesses. GSCs targeted for deployment at the IN Element, are conveyed to the IN Element and deposited in a Feature Library.

Services are designed and constructed, to a specific set of requirements, by service designers using different SCE tools and processes. Service designers can use GSCs made available to them by the SCE as above. Once constructed and tested to be network worthy, the service must be deployed in the appropriate elements in the IN Architecture.

1.4.9.1 SDI Service Engine

Services, to interwork with SDI, are developed to operate within the confines of an SDI service engine 825. The SDI service engine 825 provides a bounded environment and defined interface within which services run. The interface enables services to avail of resources outside that boundary, e.g. the virtual network directories, the physical network, physical interfaces to other operational support systems etc. The service engine 825 performs all the necessary correlation of the GSCs in the feature library with those used in a service.

The service engine 825 performs service discrimination for a call. Once the target service is identified the service engine executes the appropriate service. The service engine provides to services a mechanism for maintaining call context.

A novel aspect of embodiments of the present invention is the use of a software "blackboard" technique in the SDI service engine 825 and is described later in more detail.

1.4.9.2 Service Dictionary

A virtual network has a specific set of services. These services are added by the BT IN administrator. The collection of services available to a virtual network is localized in a Virtual Network Service Dictionary. For every Service that a virtual network has, there is a corresponding entry in its service dictionary. The entry in the service dictionary fully describes that service. An entry in the service dictionary holds:

the distribution media version of the service—the service package;

the installed service;

the directory of all that service's profiles describing how the service operates.

1.4.9.3 Service Package

Services are delivered to the SDI 200 in a distribution media format which is termed the service package. The form the media will take will not have any dependency on the contents of a service package. The service package provides all that is required to install a service into a virtual network 800 for use by the SDI service engine 825. A service package does not contain executable code. A service package references existing executable components in the SDI feature library. The service package defines the order of execution of those referenced features. The service package defines the profile description of the service. The service package is the defined service interface between the SDI 200 and the SCE 210.

1.4.9.4 SDI Service

A service is considered to be a unique entity which only has meaning within the context of a particular virtual network 800. Therefore a virtual network 800 must exist before a service can be deployed within the SDI 200. Irrespective of the similarity of two services, either in construction or behaviour, on two virtual networks, they are two distinct, and to all intents and purposes, different services.

An SDI service is an executable application that can process calls. The SDI service is constructed from the service package to form an executable application. The service engine 825 performs the linking of all the referenced executable components which the service package states comprise the service. The installed service is controllable through a management interface which shall make it possible to:

query or set the control state of a service which is one of enabled or disabled;

query or set the state of a feature;

iterate over the features in a service, i.e. move to the next feature without knowing its name;

query and set the service name;

query and set the Billing identity for a service;

query and set the ordering of feature execution within a service;

query and set the resources of a service, e.g. the maximum number of permitted simultaneous calls.

1.4.9.5 Service Profile Directory

Every service available to a user on a virtual network 800 is described by a service profile. Service profiles are stored in a service directory. It is possible to locate one, and only one, service profile in the service directory using the following individual keys:

Service profile identity

A service profile may be added to, replaced within or deleted from the service directory.

1.4.9.6 Service Profiles

A service profile defines the particular behaviour of a service and is the required description of that service as configured for a user, or group of users. A service profile is persistent. The contents of a profile are specified by service designers and are not understood by SDI. While the contents are not understood there are several things that SDI requires to read from every service profile, namely, the service name and the state of the service profile i.e. enabled or disabled. Service profiles are provisioned over the provisioning interface, service designers stipulate what users' modification rights exist. A service profile is addressable by a unique service profile identity.

1.4.9.7 Adding a Service to a Virtual Network

A service can be added to a virtual network, provided the service exists in a library on the network element; a service may be deleted from a virtual network. All services have a control state of enabled or disabled which a virtual network can read; this state is modifiable by the BT administrator (or maybe, by the service itself).

Figure 47:
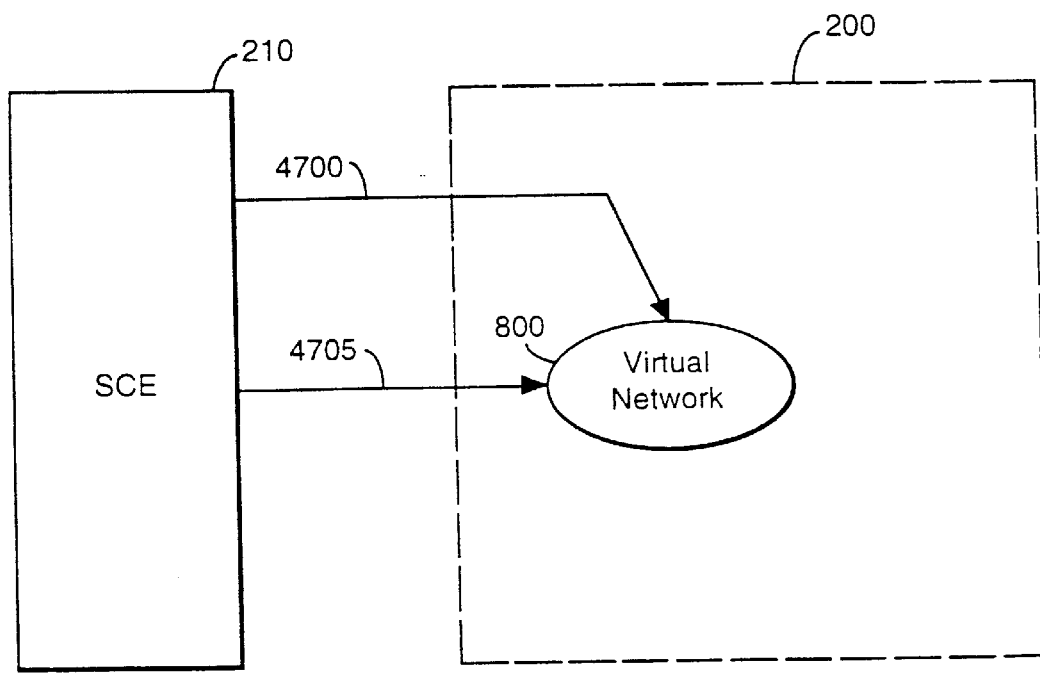

Referring to FIG. 47, the steps involved in adding a service to a virtual network 800 from the SCE 210 can be simply set out as:

i) creating a service profile and deploying it at the virtual network 800 (STEP 1); and ii) updating the user profile with a VDN and service profile reference and deploying the updated user profile to the virtual network 800 (STEP 2).

In more detail, before a service becomes available to any user on the virtual network 800, the following must occur;

the media version of the service entered into service dictionary;

the service must be installed into the virtual network.

the service must be given to a particular user.

The virtual network 800 has an operation to add a service. This operation expects a service package. The operation of adding a service causes an entry to be created in the service dictionary and the service package to be placed there.

The virtual network 800 has an operation to install a service within a service dictionary. This operation fails if either the service package is not present or if the installed version of the service is newer than the service package. The latter condition may be explicitly over-ridden. The action of installing a service does not affect any profiles for that service. Any necessary profile migration is performed by a separate means. Installing a service on the virtual network strips the necessary information out of the service package that is required by the service engine i.e.

the feature (component) references;

the feature order of execution;

specific resource information (e.g. max. simultaneous calls);

the billing identity and name of the service the service control state (i.e. enabled, disabled etc.).

The install operation causes the service engine 825 to perform the necessary actions to retrieve referenced components from the feature library and ready them for execution. If the service engine is unable to make a service ready for execution the operation of installing the service in the virtual network 800 is deemed to have failed.

The virtual network install service operation also causes the allocation of the necessary resources within the SDI 200 in accordance with the resource specification in the service package.

Service profiles for the service are constructed and edited at the SCE 210 as defined for the particular service and delivered to the Service Profile Directory through the provisioning interface.

1.4.10 Virtual Network Service Access

From the discussion on virtual nodes and virtual network address (Section 1.4.1 and Section 1.4.2) it follows that a virtual network 600 is identified by the time these are deduced. (The discussion on what is required to identify a virtual network 800 is covered in Section 1.5, "Networks Interconnection" below.)

A virtual network can be viewed as a community of users. A virtual node address does little more than to pinpoint the community. A virtual network address uniquely identifies an individual within the community.

The virtual network has the responsibility to identify a particular service. Services understand DNs; services have no concept of virtual network address.

Figure 11:
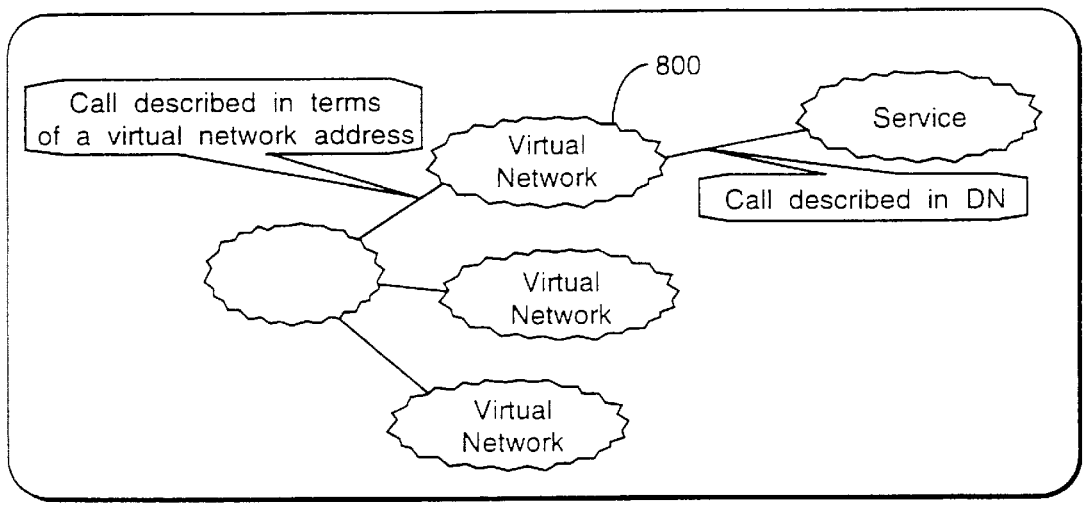
FIG. 11 shows virtual network access to a service, in the SDI of FIG. 2.

Referring to FIG. 11, the access information that a virtual network 800 requires, for an origination from the physical network, is the virtual network address. From that, the virtual network number directory (Section 1.4.5) is capable of deducing a DN. It has been previously stated that a virtual network, virtual node address, a virtual network address and a directory number all exhibit a state of enabled or disabled. If any of these states should be disabled for a given network address than access is denied. When access is denied the caller is connected to an appropriate announcement and an entry is made in the SDI log.

The DN is a key to a service name and a service profile (see the earlier discussion on user profiles; Section 1.4.7). The service profile gives the service the information required to handle this call for this user.

1.4.11 Virtual Network Toll Ticket Collector

Services require to send charging information, in the form of call detail records, to the appropriate billing systems. A call detail record may be one or a number of toll tickets produced by the service. The service designers define what a call detail record is.

A service places toll tickets with the Virtual Network Toll Ticket Collector. The contents of a toll ticket is defined by the service designer and is not understood by the SDI 200, however, it is possible for the SDI 200 to read the following about a toll ticket:

the dialog identity producing the toll ticket;

the toll ticket sequence number within the dialog;

the service name producing the toll ticket;

the type of toll ticket being one of: {Solo, First, Intermediate, Final}

When a service is added to a virtual network 800 it is able to (and, indeed, must in order to send toll tickets):

register a service name with the toll ticket collector;

register one of a possible set of toll ticket handling instructions.

The toll ticket handling instructions tell the collector what to do with toll tickets produced by a service and is one of:

automatically forward all toll tickets upon receipt;

automatically forward complete toll ticket sets.

When polled, forward all toll tickets;

when polled, forward complete toll ticket sets.

A complete toll ticket set is either a solo toll ticket or a sequence for which a final toll ticket is present. The virtual network toll ticket collector automatically purges toll tickets once delivered to the SDI billing interface.

1.5 Networks Interconnection

Figure 12:
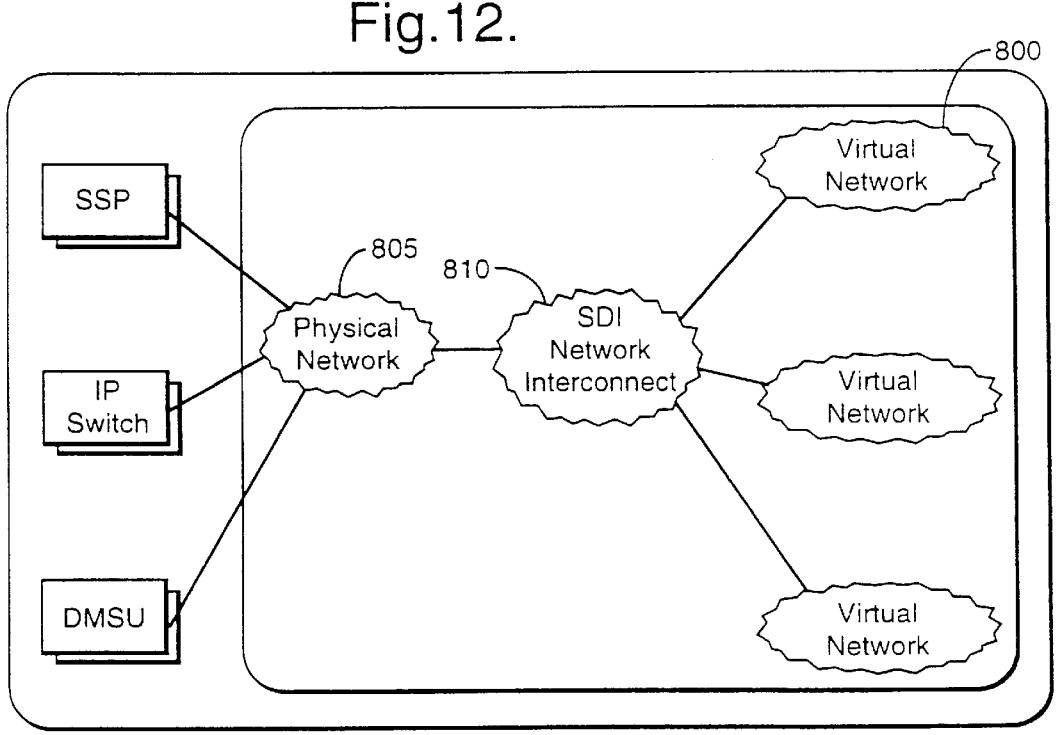
FIG. 12 shows the limited view a virtual network holds of the transmission network, via a Physical Network of the SDI of FIG. 2.

Referring to FIG. 12, the physical network 805 describes the entities in the physical network. The virtual network 800 describes the nodes in each virtual network. There is a network interconnect 810 maintaining the connectivity information of how each virtual network 800 relates to the physical and other virtual networks. The network interconnect 810 handles originations and dialogs with the physical network identifying virtual networks; and liaises with the physical network 805 on behalf of virtual networks 800.

1.5.1 Virtual Node

Referring to FIG. 3, a physical node in the physical network 805 has users of a virtual network 800 connected to it. That node must be identified in some manner to the virtual network. There is a logical means of referring to physical nodes, thereby decoupling the physical network 805 and leaving the physical network operator free to manipulate node assignments.

The virtual network 800 has virtual nodes 310. These are the only nodes a virtual network 800 is cognizant of. Users are connected to a virtual node 310 on the virtual network 800. Each virtual node 310 has a name and a virtual node address.

Virtual nodes 310 have originating and terminating attributes, which may be undefined. Undefined originating or terminating attributes signify that a node is incapable of carrying originating or terminating calls respectively. This enables the virtual network 800 to distinguish between different origination and termination behaviour for a user of the virtual network 800.

Virtual nodes can be created or deleted only by the network provider or operator for any virtual network 800. A virtual node 310 can exhibit a state of enabled or disabled. The network administrator of the network operator is able to modify the state of a node. All new nodes are created with a state of disabled until explicitly enabled. A virtual network administrator is able to view virtual node information but unable to modify it.

1.5.1.1 Virtual Node Address

Every virtual node 310 has an is referred to by a virtual node address. A virtual node address indicates the virtual network identity and the node name, or number, within that network.

1.5.2 Virtual Network Discrimination

All calls arrive at some physical node 305 in the physical network 805. It is necessary to determine which virtual network 800 should handle the call.

Virtual network discrimination is achieved through the identification of the virtual node 310 that is associated with a particular physical node 305. The virtual node address indicates the virtual network identity.

A call is handled by a virtual network 800 if an only if all the following are asserted;

the physical node address is one that is known;

the physical node address is associated with a virtual node;

a valid virtual network can be deduced;

the virtual network is active.

1.5.3 Physical Node to Virtual Node Associations

The network interconnect 810 maintains the relationships between physical nodes 305 and virtual nodes 310. It is possible to associate a maximum of two physical network nodes 305 with one virtual network node 310—one being the originating attribute and one being the terminating node.

This relationship is provisioned by the administrator of the network operator.

1.5.4 Access Numbers for Switched Access

An access number is a public number that is known to the network operator and customers as a VN access number. The access number can be either the number called (the dialled number) or the number called from (the calling line identity). An access number is to the SDI 200 a physical network address. An access number is treated just like a physical node 305 and associated with virtual nodes 310 as previously described.

1.6 Time Requirements

The SDI 200 maintains a network time which is available to all components and services. The network time is that time that is chosen for the network to operate on and is not necessarily the local time. By use of the appropriate delta value from network time, services and components are able to deduce a local time—if required. The SDI time has a granularity of one millisecond.

1.7 Persistence Model

The SDI 200 provides a persistence model for objects of virtual networks 800, the physical network 805, network interconnect objects and service objects. The persistence model shall manage the storage of all persistent objects. All managed persistent objects shall be addressed in a Managed Information Base (MIB) (not shown). The persistent store is capable of supporting real-time service applications.

It will be understood from object oriented environments that managed objects are objects in which data is encapsulated by management process software.

The persistence model provides for local backup. Services are not invasively affected by backups and operate normally during a backup. Backups may be scheduled in advance. Backups can be specified to the following levels of granularity:

Full
Physical Network
Network Interconnect
Virtual Network(s)
Feature Library
User Profiles of Virtual Network(s)
Service Profiles of Service(s) of Virtual Network(s)
Number Directory of Virtual Network(s)
Service Package(s) of Virtual Network(s)

Restoration of backed up information will cause a change in behaviour of the items being restored to reflect their state at the time it was backed up—restoration of data is an intrusive activity.

1.8 Statistics

The requirements or statistics collection and reporting will vary according to e.g. network operator and are not detailed here.

Components maintain their own statistics. Components emit statistical information when requested.

Services would be expected to have specific requirements for statistics collection.

1.9 Log

The SDI 200 has a log utility which all other components can use to log activity and event messages. The log utility interfaces with the UNIX (computer hardware operating system developed by AT&T) file system.

Log messages are of variable length. Log files are in ASCII format.

It is possible to determine the following for each log message:

Log Message Identity—a unique sequence identity.
Time stamp—a time expression recording the time of the event.
Message Type Name—one of {Exception, Activity}
Logging Component Name—the name of the component producing the log event.
Customer Context—as much information that is known about the customer when the log event is generated e.g. virtual network identity, directory number, user identity, service profile identity etc.
ASCII readable Text—The actual message.

Log files roll over at the end of a specified log period or when the log reaches a specified size. Log files are given a specified amount of disk resource within which to exist so that the operation of the node is not stopped by proliferous log messages. When log resource reaches a threshold the oldest logs are automatically purged ensuring new log messages are not lost.

All components are able to place messages on the log. It is possible to retrieve log messages.

It is possible to produce reports of logs and establish queries for the reports through a human/machine interface (HMI) screen. Log report criteria can be constructed from compounded conditions of:

Time period
Message types
Component name
Customer (virtual network)
The management of logs is provided i.e.
It is possible to force close and restart of a named log.
It is possible to delete an unopen log.
It is possible to specify a retention period.
It is possible to specify the roll-over period
It is possible to specify the roll-over size.
It is possible to specify the resource limit for logs.
It is possible to set a percentage threshold for.

The log informs network management 820 of creation, suspension, closing, deletion and roll-over of logs. Network management 820 is informed when a threshold resource limit is reached.

1.10 Process Management Control

The components of the SDI 200, and services that run under its auspices, are all contained within a finite set of manageable processes on the target platform. These processes are managed in two ways, i.e. invasively by an operator or automatically by heartbeats.

Every managed process is required to respond to a heart-beat. Failure to respond to a heart-beat for a configurable, consecutive number of times causes an automatic management action to be executed. The action can be configured and is one of:

restart
kill
suspend
(other actions?)

Invasive operations by an operator are possible. Each managed process accepts the following stimuli for the purposes of process control:

suspend (Go Out of Service)
resume (Come In Service)
reinitialise

2. SYSTEM INTERFACES

Figure 10:
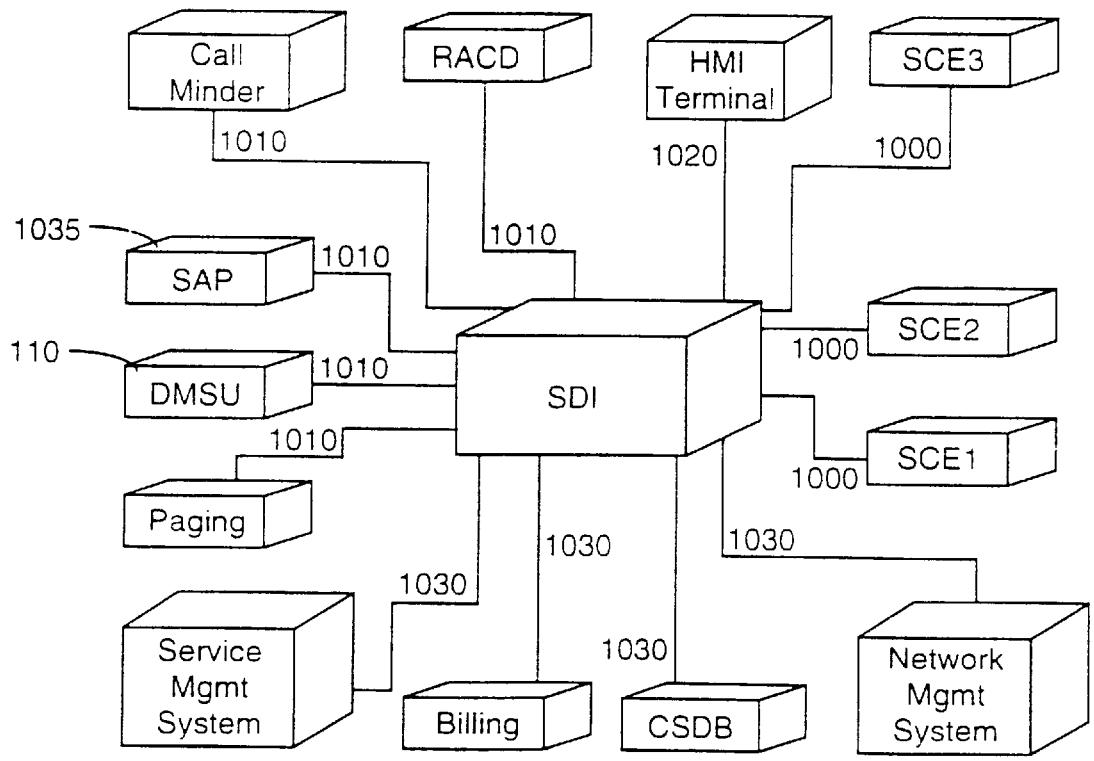
FIG. 10 shows SDI/system interfaces.

It is clear that the SDI 200 has to provide or interface with a wide range of network systems, such as Billing, these being provided overall by the intelligent network (IN). Referring to FIG. 10, the SDI has various sets of interfaces to support the deployment, operation and management of IN services. The system interfaces can be categorised as: Transport Network Interfaces 1010; Service Creation Architecture Interfaces 1000; Operations & Management Network Interfaces 1030; and Human Machine Interfaces 1020.

The interfaces to SDI will comprise those required to support the IN services to be deployed.

The transport network interfaces are discussed here as an example only. The interfaces to the physical transport network will be constrained by circumstance as well as by the design philosophy and strategy of SDI. Overall:

i) the SDI provides an abstraction of the physical transport network so that virtual networks and services can be created without requiring cognisance of the physical topology of the transport network;

ii) the SDI is an extensible and evolvable product;

iii) the SDI in the present embodiment of the invention accesses the transport network resources through a service node service logic execution environment;

iv) it is the interfaces to the transport network necessary to deliver the IN services actually to be deployed which are required.

The requirement that the Service Node SLEE is used forces these interfaces to be expressed in terms of SLEE API commands. This prevents the fulfilment of total virtual encapsulation within the SDI. In general, the SLEE is used to provide the physical interface to the devices. Thus, for example, although a DMSU network (switch) interface is physically C7 NUP to SDI the DMSU appears as a device that is driven by a subset of the applications programming interface offered by the SLEE. It is in terms of this API that the transport network interfaces are specified for the SDI on the SN platform.

2.1 DMSU Interface

The DMSU 110 is a Tandem switch in the UK PSTN 100. The DMSU 110 will pass IN calls to the SN 135 for processing. This is the only interface to the PSTN 100 that is provided.

2.2 SAP Interface

The Speech Applications Processor 1035 is an Intelligent Peripheral (IP) device connected to the service node 135 and hosts a set of interactive speech applications, used to solicit information from a telephone caller. The SDI-SAP interface will be realised through the use of a suitable Applications Programming Interface.

The remaining interfaces are each constrained by the particular proprietary equipment to which they are connected and are not further detailed herein. Other proprietary situations would require different interfaces.

3. SDI MODEL

Figure 13:
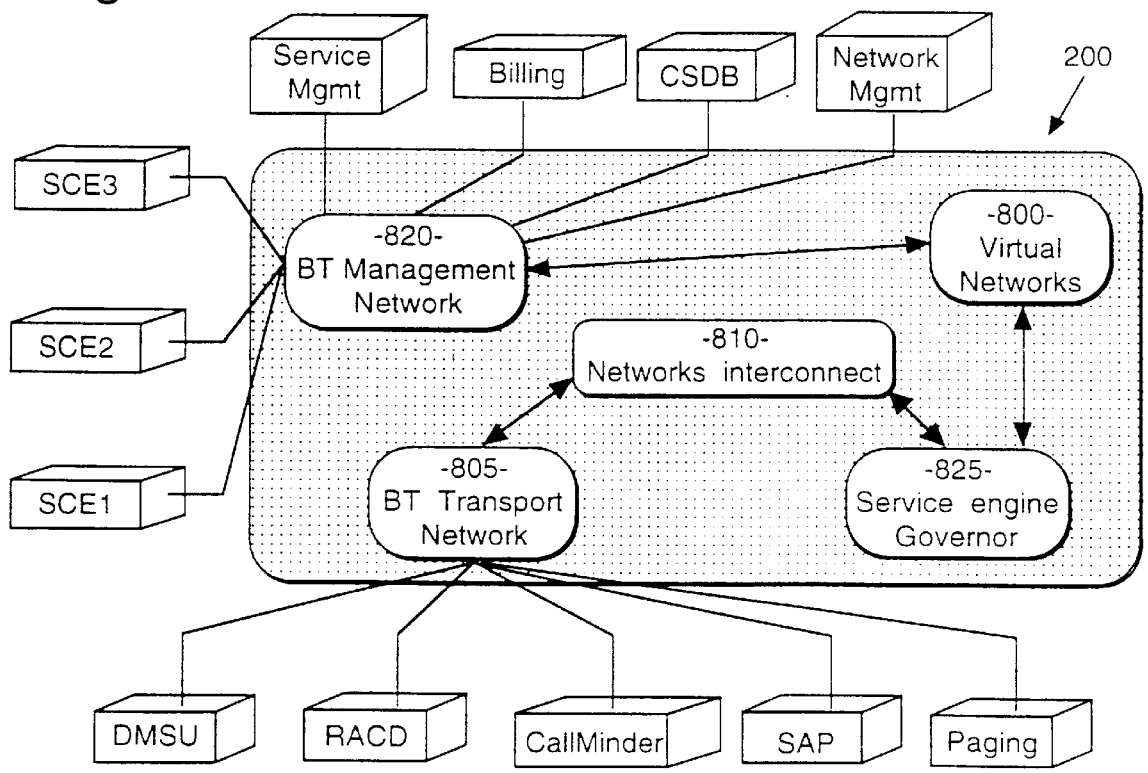
FIG. 13 shows an SDI context in terms of interfaces, internal and external to the SDI.

Referring to FIG. 13, the context of the SDI 200, in relation to a transmission network and associated systems, and major components of the SDI are shown. The SDI 200 uses the SN SLEE to interact with all transport network devices. The management network 820 uses the SLEE to interact with appropriate external network management systems.

Service creation interfaces are encapsulated within the management network sub-system 820.

As mentioned above, the SDI 200 virtually encapsulates the transport network 100 in a physical network system of interacting objects. The physical network 805 is a representation of network capability and hides network topology and protocols. The SDI physical network 805 presents a consistent network operations interface to the rest of the SDI 200 for interaction with the transmission network 100.

The Network Interconnect component 810 of the SDI 200 maintains the connectivity information between physical and virtual networks 805, 800 and provides for the interconnection between all networks. The Network Interconnect performs network discrimination. It presents the same consistent network operations interface.

IN services run in the Service Engine Governor sub-system 825. For the sake of performance, service execution is grouped into one sub-system rather than provide a service engine within each virtual network. The service engine governor sub-system 825 performs service discrimination and service execution. One could take the logical view that the service engine of each virtual network is centralized into one object for the sake of efficiency in a real time environment. The service engine governor subsystem 825 has libraries of service application features, provisioned by the SCE, that are referred to by Marketable Service Features within a Service Package.

3.2 The SDI Transaction Protocol

As described, the SDI 200 can be viewed as a set of networks and resources. Networks and resources within a network communicate with each other using defined protocols and message sets. The SDI 200 has a defined protocol for communication between resources and networks; the transaction protocol. In the context of the SDI 200, a transaction protocol resource is any element which is capable of being involved in a communication using the SDI transaction protocol. The SDI transaction protocol defines how resources talk to each other and what they say.

Resources converse using the transaction protocol. The conversation can include any number of resources but that conversation must be focused relative to a particular transaction, where a transaction is a discourse about one particular subject e.g. an IN call. The transaction protocol is transaction based, similar to the known Signalling System 7 mechanism, where transactions can be opened using a begin, continued using a continue operation and closed using an end operation.

Figure 15:
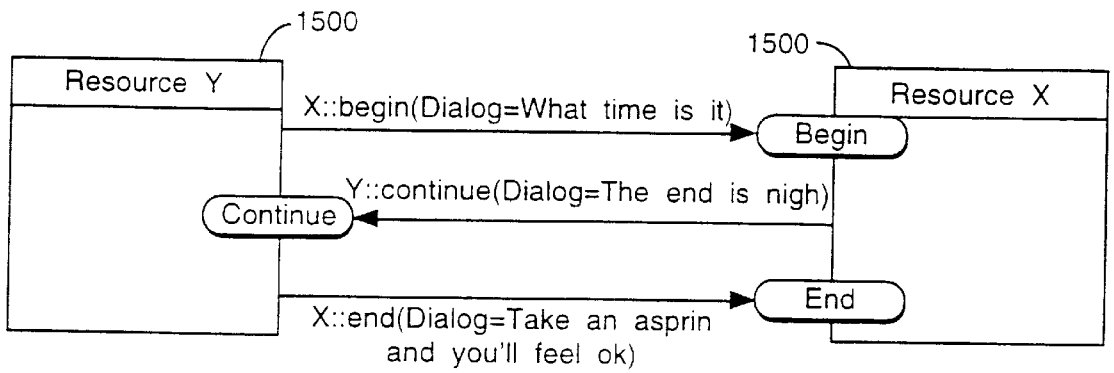
FIG. 15 shows communications between resources using a transaction protocol of the SDI of FIG. 2.

Referring to FIG. 15, the complete conversation that resources 1500 have is a transaction. Each contribution to a transaction is termed a dialog. In "well-behaved" human communication a person must first obtain the "ear" of his audience and then deliver his message.

In and SDI transaction protocol the attention of the target resource is gained by the use of begin, end and continue methods. The message is delivered to the listener is a dialog.

Figure 28:
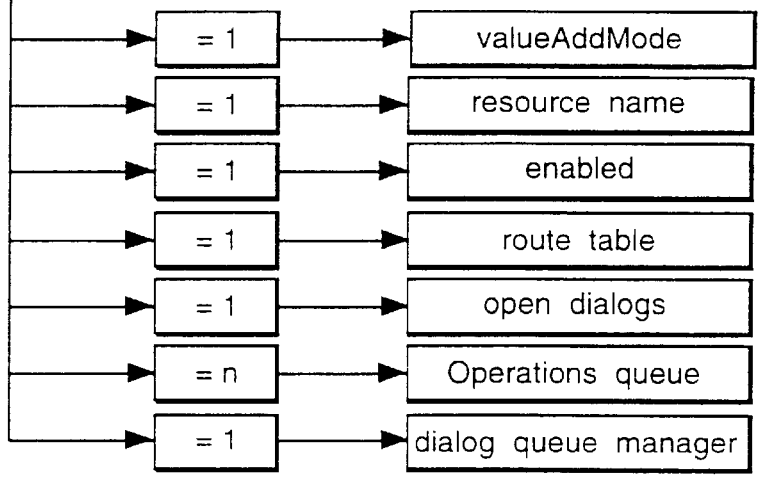

Referring to FIG. 28, the SDI Transaction Protocol 2800 is the abstract base class for resources 1500. It provides for the behaviour of routing dialogs between resources 1500, and queuing dialogs until the resources is able to handle them.

A transaction protocol resource 1500 can have a state of value-add mode. This enables it to realize that, although the dialog is not intended for this resource, it may have some value to add to it so as to make it meaningful to the target resource. A resource in value add mode scans the dialog's parameters and adds any missing information to which the resource has access. Resources have status information and may be enabled or disabled.

The SDI Transaction Protocol 2800 provides for the handling of three different dialog transaction types: begin, continue and end. A begin is not possible if there is an entry in the open dialog list with the same transaction identifier. Continue and end are not accepted if the transaction has not been opened.

3.2.1 Dialog

Figure 16:
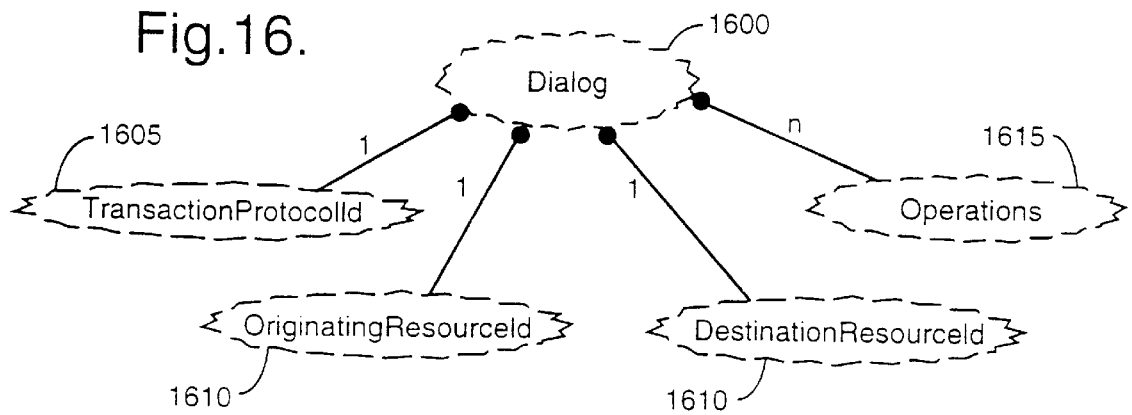
FIG. 16 shows a dialog composition using the transaction protocol.

Referring to FIG. 16, a dialog 1600 is a commuting object that allows the exchange of information between two resources involved in a transaction. A dialog identifies the transaction to which it relates by the transaction protocol identity 1605. It contains the resource names 1610 that correspond to the sender and addresses of the dialog. Also it has one or more operations 1615 to be carried out by the destination resource.

Operations 1615 can be added and removed to a dialog 1600. There is no way to specify the order of placement of operations within a dialog. Operations 1615 are returned from a dialog in first-in-first-out order. The transaction Protocol does not enforce any order of processing of operations on a resource.

3.2.1.1 Routing Dialogs

Resources 1500 are grouped into resource areas. Each resource area has an are router, which is the only resource that knows about resources in other areas. The resource naming convention is used to group resources and inherent in this convention is the area router for a particular resource group.

Dialogs 1600 are routed based on the value of destination resource and originating resource. The originating resource most recently sent the dialog. Each resource only knows about the resources it has connected to it, and their area router.

This information is stored in a routing table. Resources use the routing table to pass the dialog through the system. If the destination is in the routing table it proceeds to the destination. Otherwise, if there are two entries in the routing table it proceeds to the one not equal to the originating resource. If there are more than two entries in the routing table it sends the dialog to its area router. If the current resource is the area router, it sends the dialog to the network interconnect.

3.2.2 Operations

Figure 17:
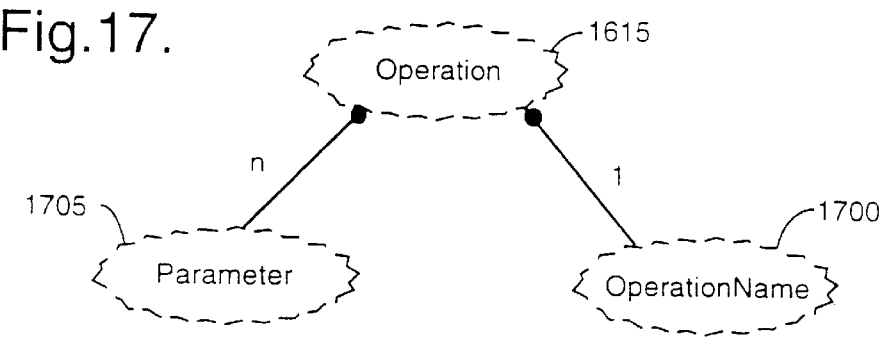
FIG. 17 shows the components of an inter-resource operation using the transaction protocol.

Referring to FIG. 17, operations 1615 are the mechanism by which resources 1500 have other resources perform some action. An operation 1615 can be to initiate some action or it can be the response to some previous operation. The operations that are valid for a particular resource are dependent on that resource. A resource rejects operations it does not understand.

Every operation 1615 has a unique name 1700. Operations can have one or more parameters 1705 associated with them.

There are a number of categories of operations 1615 that are identified as required:

Connection Operations—those that are required to manipulate the parties involved in a particular IN call.

Announcement Operations—those operations to effect the connection of network resident announcements to a party in a call.

Collection Operations—those requiring the collection of information from a party.

3.3 Transport Network Abstraction

Referring to FIG. 29, the SDI Transport Network 805 is a virtual encapsulation in software hiding the detail of network elements, signalling protocols, call models, physical access mechanisms and changes to the transmission network 100. The Transport Network Abstraction 805 is a Transaction Protocol Resource 1500 communicating internally and externally using dialogs 1600.

(Note the terminology of the components of the SDI physical network 805 shown in FIG. 29 are either known from this specification or can be identified by reference to terminology of the current UK PSTN. For instance, "RIDE"0 is a system for supplying recorded information from a distributed information environment.)

The physical network 805 operates on elements as requested by dialog operations and directs events from the transmission network 100. It localizes any specialized knowledge of individual physical network elements. The SDI 200 ensures the graceful release of resources when a call is cleared.

Some limited physical attributes of a station e.g. display capabilities for caller name display are propagated. The physical elements to which SDI must interface are virtually encapsulated in software. It is possible to have any number of instances of that element type, e.g. there could be N instances of DMSU representing the N actual DMSUs declared to SDI. Virtual encapsulations of physical elements can be created, modified and deleted as required to reflect the physical transport network 100.

A virtual encapsulation is provisionable with the state information of the actual element, e.g. for a Speech Applications Processor (SAP) it reflects the SAP-identity and all application identities and parameters as configured by network operations. Each virtual encapsulation is addressable and state information is provisionable and modifiable through the provisioning interface.

3.3.1 View of Parties in a Call

A call is a communication of some sort. A communication is considered only to be meaningful when more than one party is involved. All parties in a call need not be human e.g. a tone generator, an announcement player etc. Each party in a call is connected to some physical entity, this connection is termed a Leg of a call.

Figure 18:
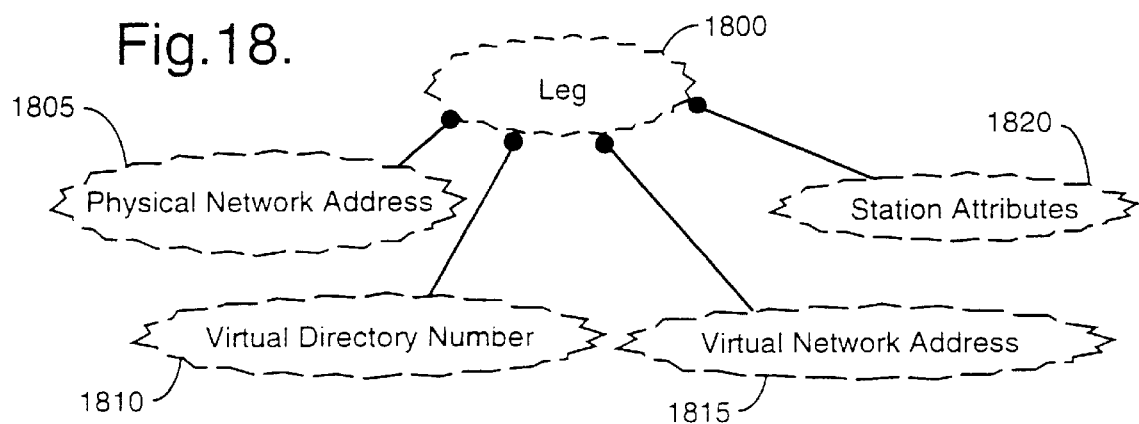
FIG. 18 shows the components of a leg in a call expressed in the transaction protocol.

Referring to FIG. 18, a Leg 1800 represents a party in a call, both in terms of the physical and virtual network. The leg contains the physical network address 1805, virtual network address 1815, virtual directory number 1810 and station attributes 1820.

All of this information may not be present when a leg 1800 becomes known to the SKI 200; e.g. inbound legs will only have transport network information present. Leg information can be enriched by a number of resources within the SDI 200. Discussed here is a leg 1800 as a commuting object that is understood by Network Interconnect 810 and Service Engine Governor 825.

3.3.1.1 Physical Network Address

Figure 19:
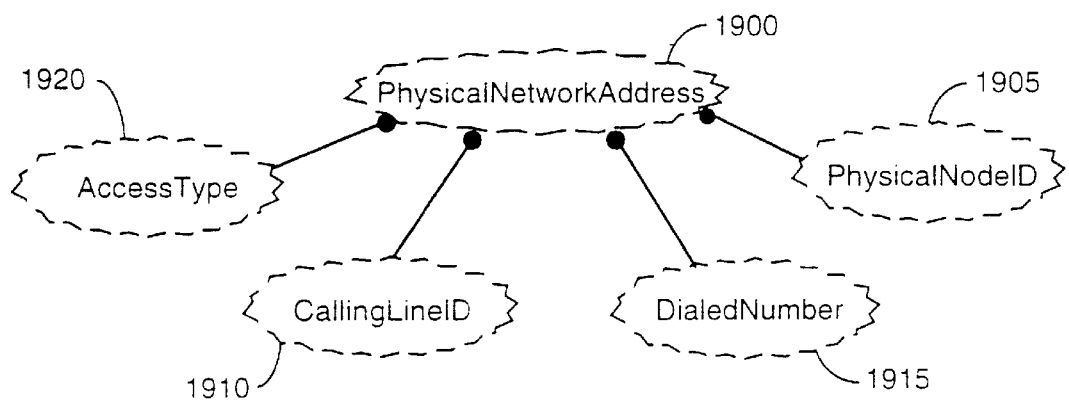
FIG. 19 shows the composition of "Physical Network Address", a component of the leg of FIG. 18.

Referring to FIG. 19, stations are connected to nodes in the physical network 805. A physical network address 1900 uniquely identifies a station in the physical network 805. It contains a physical node identifier 1905, the calling line identification 1910, the number dialled 1915 and the access type 1920 of the physical node. This information is passed in the Leg 1800, and used in virtual network discrimination by the network interconnect 810 (see Section 3.6.5 "Connectivity Directory").

3.3.2 Physical Transport Network Operations

As a transaction protocol resource 1500 the physical network 805 conveys and receives information in the form of dialogs 1600 and the operations 1615 contained therein. The operations that are available on the physical network in dialogs are not specific to a particular device in the network or a particular network topology.

3.3.2.1 Connection Operations

Create, delete and join leg are operations understood by the physical network 805. The create leg and delete leg operations take one or more legs as a parameter. The join leg operations takes two or more legs as parameters.

3.3.2.2 Announcement Operations

The physical network 805 understands the PlayAnnouncement operation. This operation has as parameters:

virtual announcement identifier;

language;

leg to play it on.

The detail of these parameters is covered in Section 3.3.7 "Announcements, Speech Applications & Associated Devices".

3.3.2.3 Collect Digits Operations

A service can request the collection of digits from the originating leg of a dialog. For a collect digits request, the service engine governor 825 sends a "dialog continue message" to the network interconnect 810. The dialog contains the collect digits operation with the following parameters: 1) originating leg; 2) number of digits to collect; 3) interdigit timeout; 4) total timeout. The NI 810 passes the dialog to the physical network. This dialog goes to the resource allocator 2900.

The resource allocator 2900 uses its resource capabilities table to determine whether the originating resource 1500 identified in the originating leg of this dialog can collect digits. If the originating resource can collect digits, the resource allocator 2900 sends a "dialog continue message" to the identified resource containing the collect digits operation and the parameters listed above.

The originating resource must then translate the collect digits operation request to physical hardware commands which instruct the resource to collect the digits.

3.3.3 Access from the Transport Network

All parties on a call use a station connected to a physical node. To the SDI 200 a physical node is a particular trunk on a particular device in the transport network. As, mentioned above, there are two modes of access to the SDI physical network 805—dedicated and switched.

3.3.3.1 Physical Node

Dedicated access is where calls arrive on a dedicated node. Switched access is where calls are switched and arrive on a common node. Each physical node is provisionable as dedicated or common.

Figure 30:
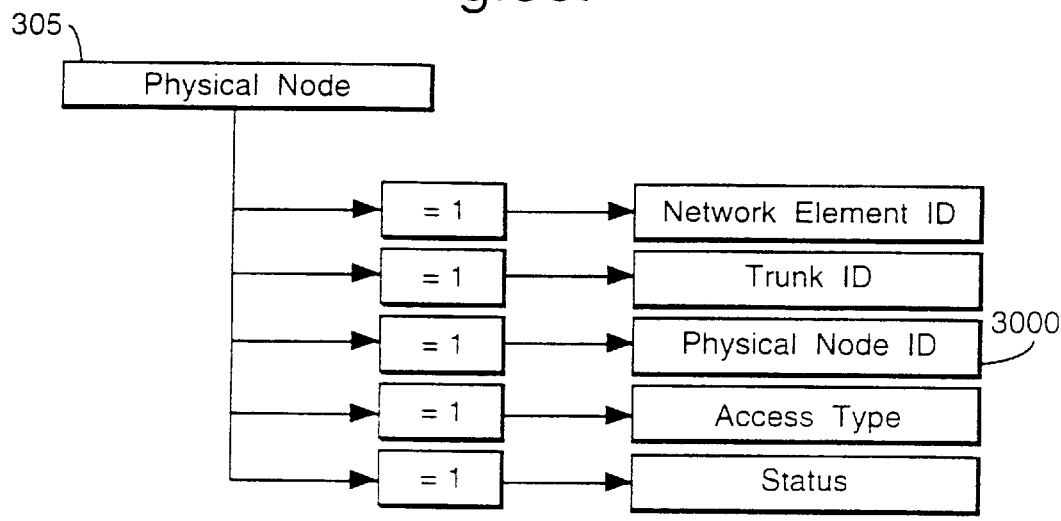

Referring to FIG. 30, a SDI physical node 305 is a provisionable abstraction of a physical network element and a trunk that uniquely identifies a group of stations in the transmission network 100. It contains provisionable access type and status information. The physical node id 3000 is a field that uniquely identifies the physical node.

3.3.3.2 Physical Node Directory

Figure 31:
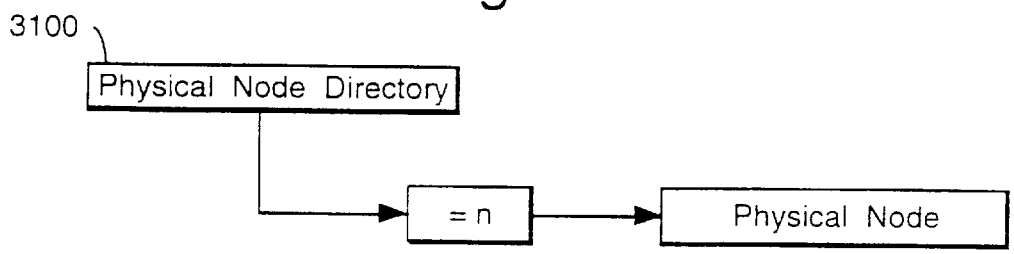

Referring to FIG. 31, the physical node directory 3100 is a persistent store for all of the provisioned physical nodes. It allows physical nodes to be addressed for provisioning by a physical node id.

3.3.4 Resource Allocator

Figure 32:
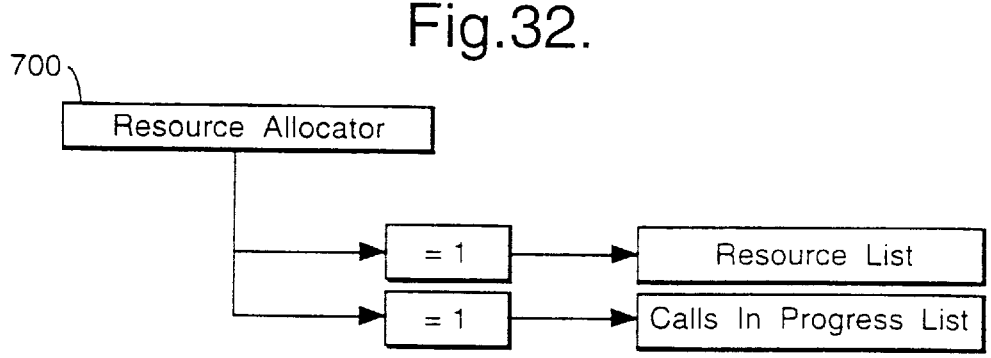

Referring to FIGS. 7 and 32, the resource allocator 700 knows the presence of and capabilities of physical elements encapsulated in the transport network abstraction. It decouples particular elements from each other and hides the composite nature of many network operations.

The resource allocator 700 maintains a list of physical resources and has knowledge of their capabilities e.g. the resource allocator which elements can deliver a particular announcement. It maintains a list of resources currently allocated to particular calls in progress.

Figure 14:
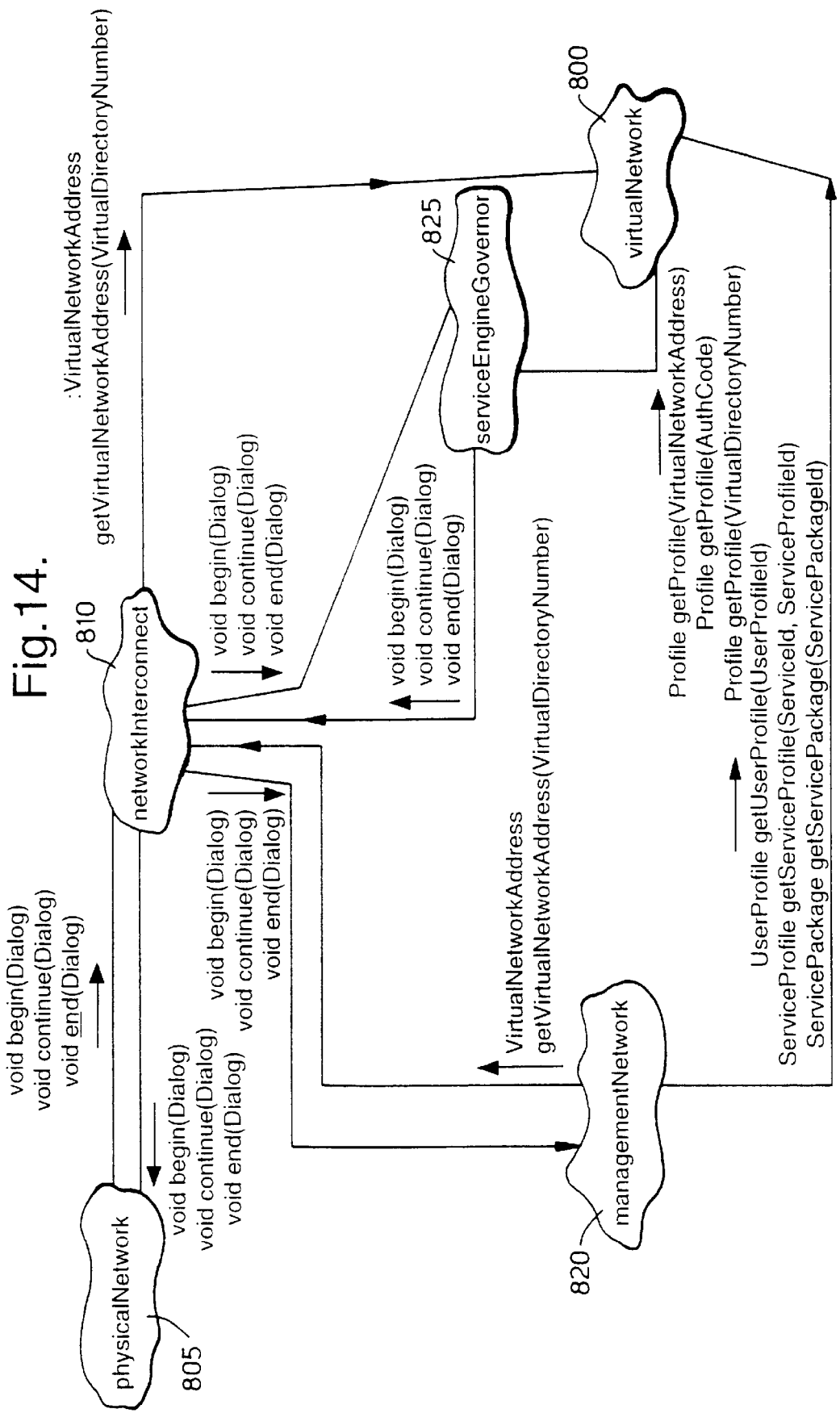
FIG. 14 shows a message diagram for the SDI of FIG. 2.

It deduces which physical resources are available to allocate perform operations for active calls. The resource allocated allocates resources based on the operations in the dialog, its knowledge of physical network element capabilities and on load factors. Referring also to FIG. 14, which shows message routing in the SDI 200, for incoming calls, the resource allocator 700 of the physical network 805 adds the call to the calls in progress list and sends the dialog on to the network interconnect 810.

Upon receipt of a dialog containing these the resource allocator 700 determines which physical network elements are needed to perform the operations. It may route the dialog to those elements or depending on the operation send a different dialog to one or more elements.

The resource allocator 700 uses an announcement catalog to determine which resources 1500 could service a Play Announcement Operation and will if necessary, look ahead in the dialog to ensure the correct resource is used should a collect digits to be the next operation.

3.3.5 Use of Service Node SLEE

Figure 20:
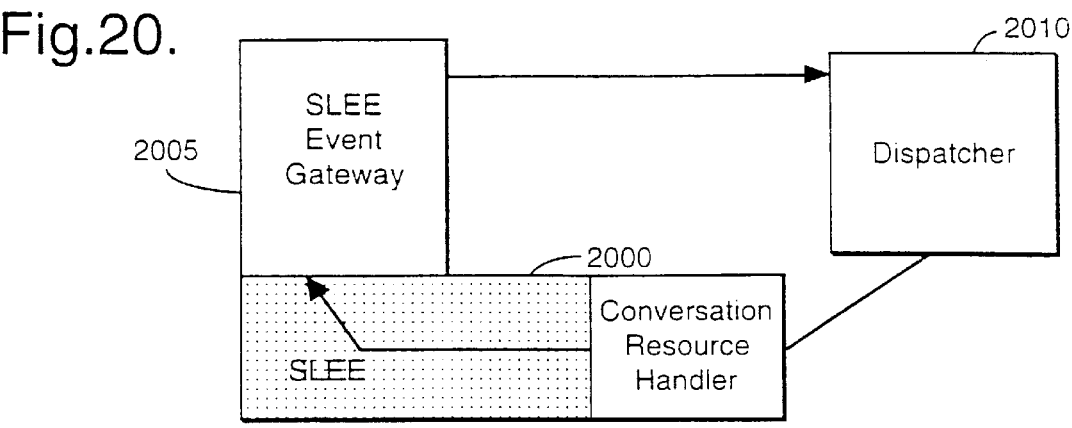
FIG. 20 shows a communication model for a SLEE supporting an SDI application.

Referring to FIG. 20, the network operator SN SLEE 2000 expects IN applications executing on it to have knowledge of the transport network topology;

go to the SLEE to look for new call events;

only process one call at a time within one application;

suspend a call before looking for another call event;

use a specified API to interact with the network and management elements.

These points do not support the general principles of the SKI in which the services have no knowledge of the underlying network topology, are multi-threaded to handle multiple calls simultaneously and expect to receive asynchronous unsolicited events from the network.

In order to use the SLEE 2000 to feed the SDI call events, an SDI application will run on the SLEE. This application will solicit events from the SLEE and push commands back out to the transport network. There are two halves to the SLEE interface; an event gateway 2005 which is a SLEE application with the API bound in , capable of handling one call at a time, and a conversation resource dispatcher 2010 which will dispatch events from the gateway 2005 into the SDI 200 and from the SDI 200 back to the gateway 2005.

The SleeEventGateway 2005 is the main interface between the SDI 200 and the SLEE 2000. It retrieves call events from the SLEE call event queue.

Call events may be inbound events from the transport network or outbound events from the dispatcher. The events are either passed them to the SDI for further processing or SLEE API calls are made to perform operations requested by the SDI on the physical network IP resources. It uses the call event message group and event type to determine what actions to take. Call event message groups, defined by the SLEE API, are:

1) API-TIMER-EVENT (delayed timer event)

2) API-ERROR-EVENT (error)

3) API-CM-EVENT (C7 call model event)

4) API-SWITCH-EVENT (switch event)

5) API-SEMAPHORE-EVENT (SLEE semaphore event)

6) API-CONV-EVENT (conversation resource event)

7) API-IP-RES-EVENT (IP resource event)

8) API-MGMT-EVENT (application management event group)

The SleeEventGateway 2005 sits in a loop, continually communicates through the SLEE API to get the next call event, processes the call event, suspends the call, and gets the next call event. The SleeEventGateway ;2005 sends new incoming call events to the SDI 200 for further processing via the dispatcher 2010. For continuing messages (in-progress calls), it sends the SDI IP resource operation request to the SLEE IP resources and it sends the SLEE IP resources' responses to the SDI 200 via the dispatcher 2010. For call termination, it sends a request to the SLEE's API Finished Handler, which starts call clearing down process.

To facilitate the communication among the SleeEventGateway 2005, the SLEE 2000, and the dispatcher 2010, the dispatcher 2010 is registered as a SLEE Conversation Resource. The SleeEventGateway 2005 calls SLEE API functions to pass the call events to the dispatcher 2010. The SLEE always assigns a SLEE dialog ID to a new incoming call event before sending the message to the Dispatcher. The SLEE dialog ID uniquely identifies this call event in the context of the SLEE 2000 and is constant for the duration of this call event.

3.3.5.2 Dispatcher

The Dispatcher 2010 receives call events from the SleeEventGateway 2005, transfers them into SDI Dialog messages, and dispatches them to the appropriate SDI Physical Network resource interface objects. It also receives SDI Dialog messages from the SDI Physical Network resource interface objects requesting operations to be performed on the SLEE IP resources. It converts these requests into the SLEE call events, sends them to the SLEE CRH (Conversation Resource Handler). The SLEE CRH places these call events back to the SLEE call event queue.

The Dispatcher 2010 is registered as a SLEE Conversation Resource in order to use the SLEE CRH to communicate with the SleeEventGateway 2005. The SleeEventGateway 2005 sends the Dispatcher the call events retrieved from the call event queue. The Dispatcher then dispatches the call events to the SDI Physical Network resource interface objects.

As SDI Dialog object is used as a commuting object that conveys state and operational instructions between resources involved in a transaction. The Dispatcher uses the dialog object to communicate with physical network resource interface objects, e.g. a DMSU, the SAP, and RIDE.

Depending on the message group and state of a call event, the dispatcher 2010 sends a dialog message to the appropriate SDI Physical Network resources interface objects.

3.3.5.3 New Incoming Calls

The call event retrieved may be of call event message group API_CM_EVENT with an Incoming Call event, indicating that this is a new incoming call. The Dispatcher 2010 creates a Dialog object. The Dialog object contains a Dialog object ID 1605 (TransactionProtocolID), which uniquely identifies this call event in the context of the SDI. The Transaction Dialog ID 1605 is associated with the SLEE dialog ID in the call event, and the association is stored in the Dialog Dictionary. The Dispatcher 2010 may, for example, create a Dialog object, and send the DMSU a begin(Dialog) message.

3.3.5.4 Continuing Calls

The dispatcher 2010 may, for example, receive a message from the SDI RIDE interface object. This message requests that an announcement be played to the caller. The dispatcher 2010 maps the TransactionID 1605 in this request to the SLEE dialog ID, generates a SLEE call event message and sends it to the SLEE CRH. The SLEE CRH places this message on the SLEE call event queue as a normal call event message. The call event is now back into the context on the SLEE.

When this call event reaches the top of the queue, the SleeEventGateway 2005 retrieves the call event off the queue and calls the SLEE 2000 to perform the operation as requested. The SleeEventGateway then suspends the call.

Upon completion of playing the announcement to the caller, the SLEE IP resource RIDE sends a response message to the SLEE 2000. This message is added to the SLEE call event queue as an API IP Resource Message event. When the SleeEventGateway 2005 retrieves this call event, it passes the call event ti Dispatcher 2010. The Dispatcher maps the SLEE dialog ID in the call event to its associated TransactionID 1605. The Dispatcher places the TransactionID in a Dialog object and sends a continue(Dialog) message to the SDI RIDE interface object.

3.3.5.5 Call Termination

When a end(Dialog) message is received from the SDI resource interface objects, indicating that the call has been completed, the Dispatcher 2010 sends the SLEE 2000 a call completion message. This message is added to the call event queue. The SleeEventGateway 2005 starts call clearing down process when it retrieves this call event. The Physical Network resources are freed, and the SLEE dialog ID is also freed.

3.3.6 PSTN Elements

All interfaces to the PSTN are made via one Digital Main Switch Unit 110.

3.3.6.1 Digital Main Switching Unit

Figure 21:
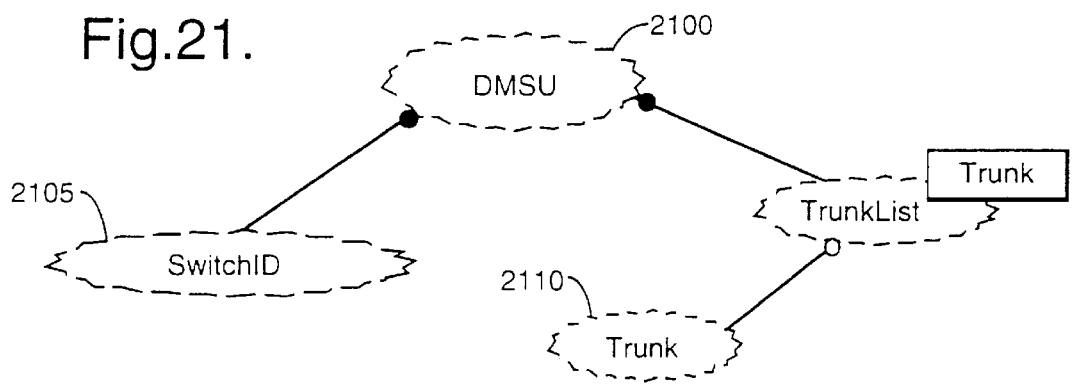
FIG. 21 shows components of a DMSU as a Transport Network Resource using the transaction protocol.

Referring to FIG. 21, DMSU 2100 encapsulates the state of a DMSU switch. A DMSU has a SwitchID 2105 and Trunks 2110. A DMSU can be enabled and disabled. The Administrator of the network operator provisions the DMSU 2100 with Trunks. A DMSU translates between DMSU Trunks 2110 and transmission network nodes 300. For an incoming leg, the DMSU consults the physical node directory to find the physical node 300 associated with the incoming trunk. For an outgoing leg, the DMSU 2100 consults the physical node directory with the physical node to determine the DMSU trunk.

3.3.7 Announcements, Speech Applications & Associated Devices

An announcement is a message that is available to be relayed to a user. Announcements either inform of progress and require no response or are prompts for collection of information. All announcements that are available are in the Announcement Catalog.

There are two levels of announcement addressing. One is the virtual announcement identifier which refers to a particular meaning e.g. "Your call cannot be completed at this time". The other is address the actual physical announcement recording of that meaning in a particular language.

The resource allocator 700 queries the announcement catalog with the virtual announcement id and the language to determine the resource to play the announcement. The announcement catalog contains mappings of virtual announcements and language to physical announcements. A physical announcement has an identifier and comprises:

the host resource identifier, resource command identifier, port capability i.e. how many calls can be connected to this announcement, priority (ordering or weighting).

The only announcement and speech applications program required for the present embodiment of an SDI is the Speech Applications Processor.

3.3.7.1 Speech Applications Platform

Figure 22:
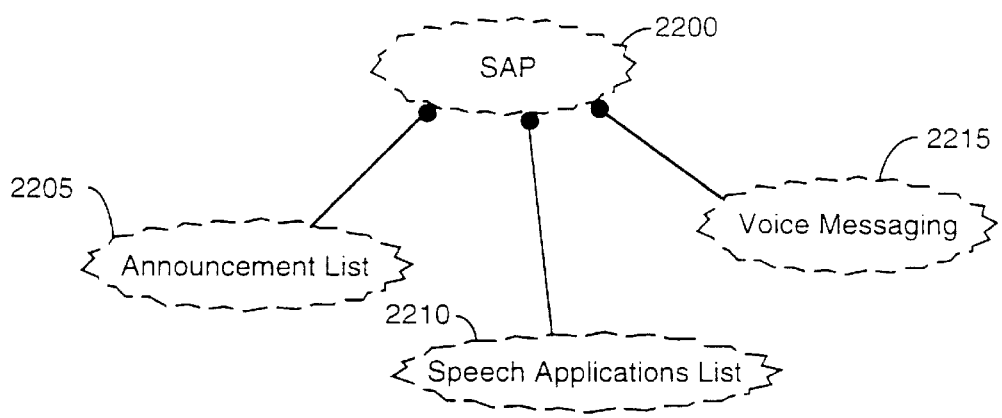
FIG. 22 shows components of a Speech Applications Platform as a Transport Network Resource using the transaction protocol.

Referring to FIG. 22, the Speech Applicants Platform provides voice interaction functions such as playing announcement, playing speech applications (performing an interaction of playing announcement and collecting DTMF or spoken digits), requesting a yes or no response form the caller, and performing a voice messaging application by recording and playing voice messages. Despite the complexity of its operations it can be viewed as a device which plays an announcement as a prompt and ultimately returns information. Thus, the application on the SAP can be viewed as just Announcements and the result of the application as Information collected from a call party.

The SDI SAP encapsulation object 2200 accepts requests from the SDI 200 and translates the requests to SAP interface commands.

The SAP consists of an announcement list 2205, a speech applications list 2210, and a voice messaging system 2215. The announcement list 2205 contains associations of announcement identifiers and resource commands. The speech applications list 2210 contains the available speech applications that can be played. The voice messaging system 2215 is a command driver for the voice message subsystem of the SAP equipment.

3.3.8 Paging System

A virtual network user can be alerted using a radio pager. The radio paging interface (see FIG. 13) provides a means for services to make a paging request to a radio paging service. A numeric or alphanumeric message can be sent to compatible types of radio pagers.

3.4 Virtual Network

Figure 33:
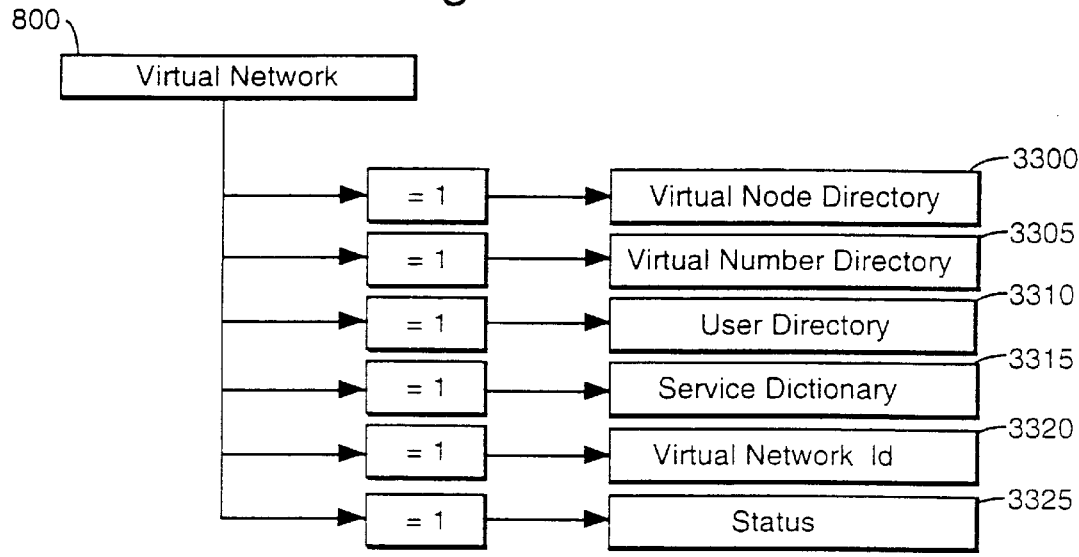

Referring to FIG. 33, a virtual network 800 consists of a set of directories which maintain the logical associations between users of the network and the capabilities which are provisioned for them. Virtual network directories provided for this purpose are a Virtual Node Director 3300, a Virtual Number Directory 3305, a User Directory 3310, and a Service Dictionary 3315. Additionally, each Virtual Network 800 has a unique Virtual Network Id 3320 and a Status 3325 for enabling or disabling the Virtual Network 800 as needed.

The Virtual Node Directory 3300 provides a collection of the Virtual Nodes 310 that are available on the Virtual Network 800. The Virtual Number Directory 3305 maintains associations between Virtual Network Addresses and Virtual Directory Numbers. The User Directory 3310 stores user profiles which link virtual directory numbers and authorisation codes to the services provisioned for a user of the network. Services are delivered to a Virtual Network in a Service Package. Services are installed and stored in the Service Dictionary 3315.

Figure 34:
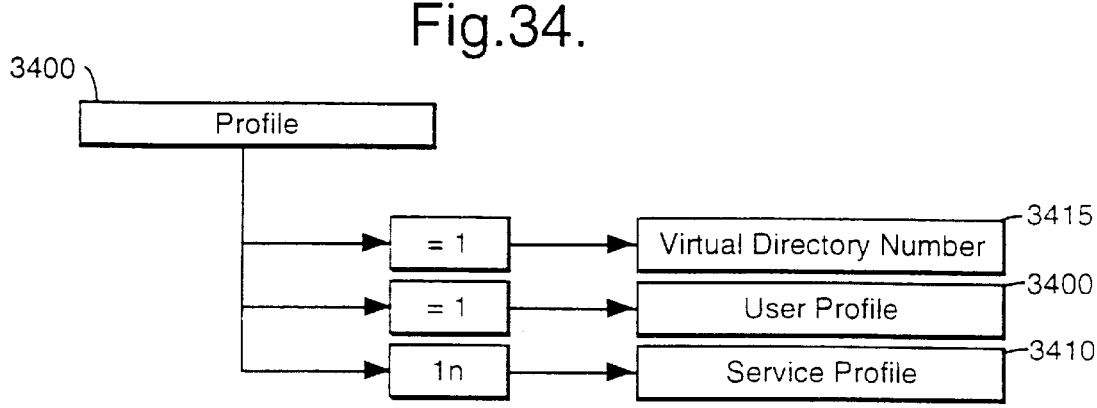

Referring also to FIG. 34, the Virtual Network 800 builds a Profile 3400 for use by the Service Engine 825 in delivering a service. A Profile includes a user profile 3405 and all of its related service profiles 3410. A Profile is obtained form the Virtual Network 800 by use of a VirtualNetworkAddress, an Authorisation Code, or a Virtual Directory Number Key.

3.4.1 Profile

A profile is a commuting object which contains all that is known about a particular Virtual Network user that may be required to process a call. It commutes between a virtual network 600 and its associated service engine governor 825. It contains a virtual directory number 3415, as well as the user profile and one or more service profiles.

Figure 23:
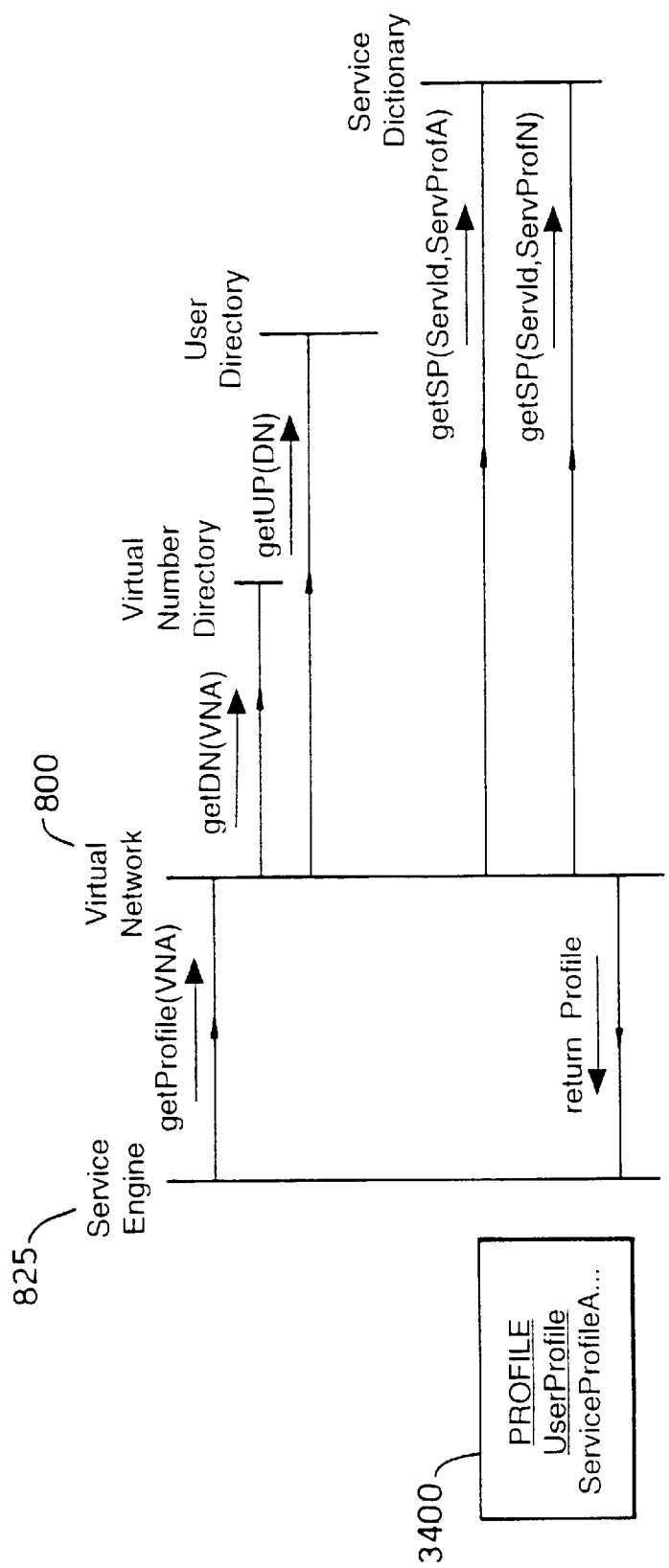
FIG. 23 shows an event trace for a profile retrieval by a Virtual Network.

Referring to FIG. 23, a Virtual Network 800 also retrieves a specified service, given a service id, or can iterate over all services within it.

Virtual Network messages are shown in FIG. 23. These messages provide Virtual Network functional and provisioning capabilities.

3.4.2 Virtual Node Directory

Figure 35:
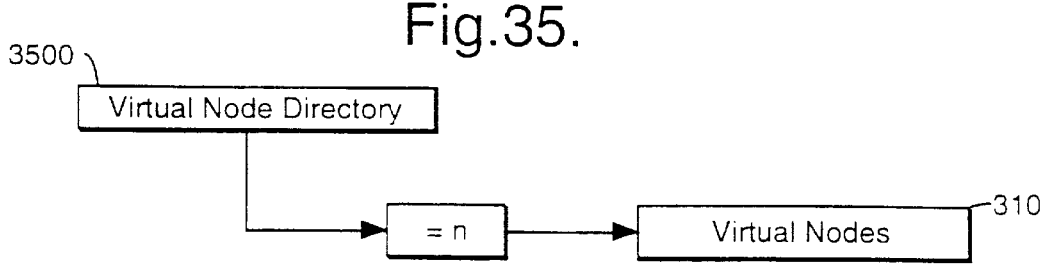

Referring to FIG. 3 and 35, virtual nodes 310 represent a virtual network's access points to a physical network 805 or another virtual network 800 Virtual nodes 310 are stored in a virtual node directory 3500 which contains all of the virtual nodes 310 which have been provisioned for a specific virtual network 800. Virtual nodes 310 can be added to or deleted from the virtual node directory 3500.

3.4.3 Virtual Number Directory

Figure 36:
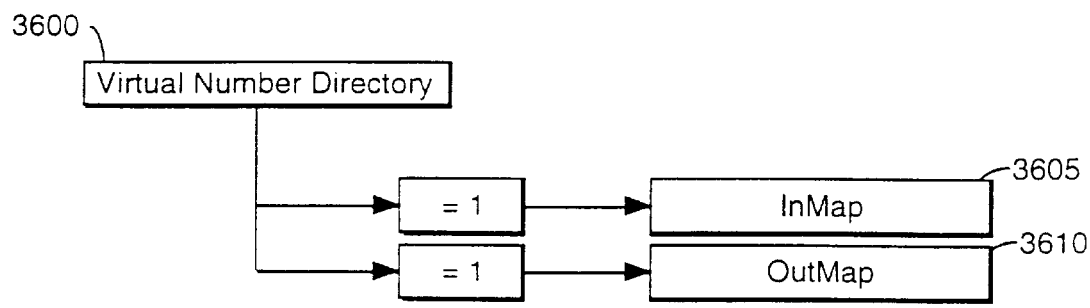
Figure 37:
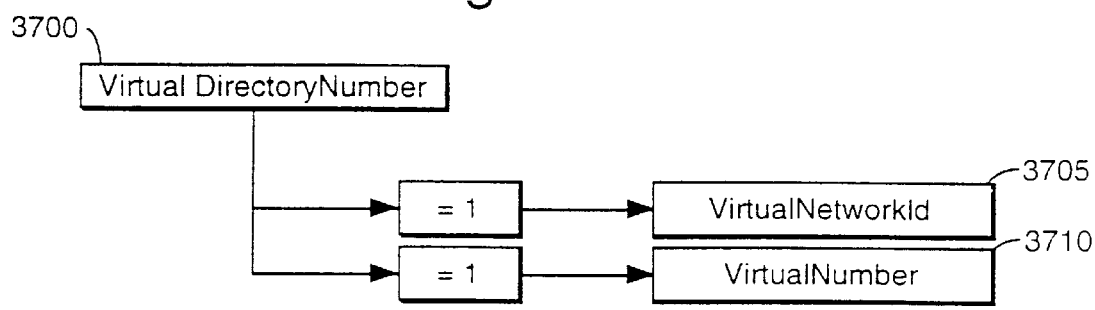

Referring to FIG. 36, a virtual directory number (VDN) is a unique virtual network number. A VDN identifies the virtual network 800 to which it belongs. A virtual directory number is a logical entity and is independent of a particular node or service on the network. Stations on the network are described by virtual network addresses (VNA). Users of a virtual network have virtual directory numbers (VDN). Associations of virtual network addresses with virtual directory numbers are maintained by the virtual number directory 3600. Each association is explicitly provided by maps in the virtual number directory. An in-bound map (InMap) 3605 provides VNA to VDN translations while an out-bound map (OutMap) 3610 provides VDN to VNA translations. Given a Virtual Network Address, the Virtual Number Directory 3600 returns the associated Virtual Directory Number. Likewise, given a Virtual Directory Number, the associated Virtual Network Address is returned.

3.4.3.1 Virtual Directory Number

Referring to FIG. 17, a virtual directory number 3700 is a unique representation of a user on a virtual network. A virtual directory number has a virtual network identifier 3705 and a virtual number 3710. The number is a TBCD (Telephone Binary Coded Decimal) encoded digit string.

3.4.3.2 Virtual Network Address

Figure 38:
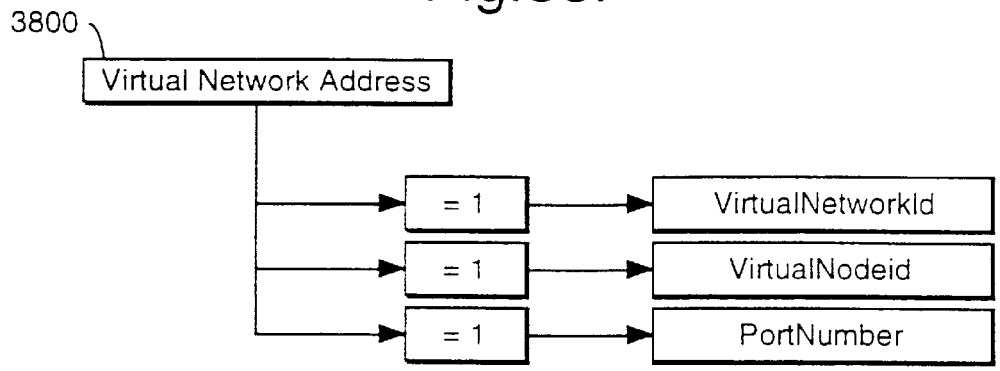

Referring to FIG. 38, a virtual network address 3800 identifies a station on a particular virtual node in a particular virtual network 800.

3.4.4 User Directory

Figure 39:
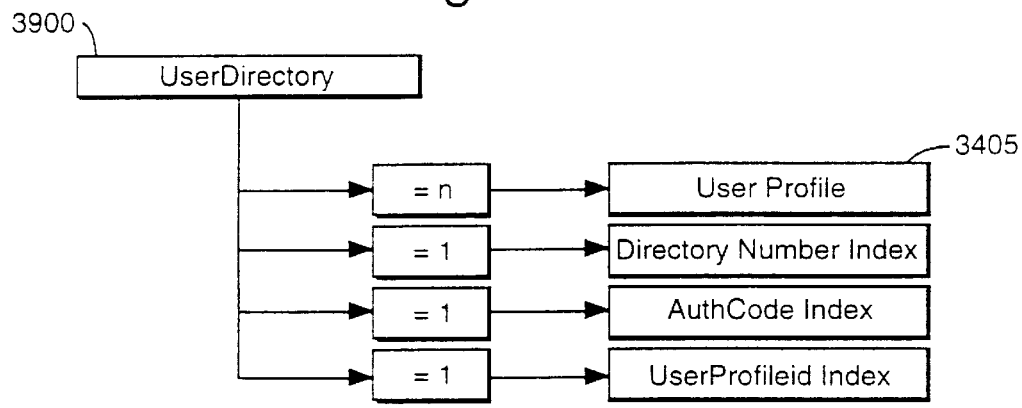

Referring to FIG. 39, user profiles 3405 detail user related information and the provisionable capabilities for each user on a virtual network. User profiles are stored in a user directory 3900. User profiles 3405 can be obtained from the user directory by use of a virtual directory number 3415, an authorisation code, or a user profile id key. A user profile may be added to the directory 3900 or one may be deleted by adding a null profile with the existing id.

3.4.5 Service Dictionary

Figure 40:
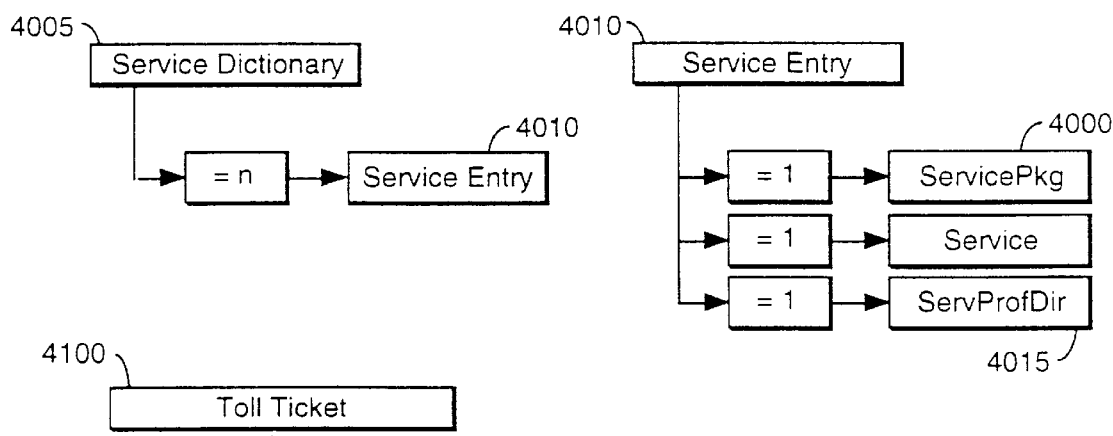

Referring to FIG. 40, a service is delivered in ASN.1 media format as a service package. The service package 4000 is the definition of a service. A service package specifies the features from which an executable service can be installed into a virtual network 800. The association between a service package, an installed service, and its related service profiles is provided by an entry 4010 in the service dictionary 4005.

The service dictionary 4005 stores and maintains these service entries 4010. The service dictionary 4005 can locate a specified service entry in the dictionary to retrieve the service and access its related service profile directory 4015 to retrieve specified service profile(s).

The service dictionary 4005 can add service packages 4000 or service profiles, and install services. The service dictionary can access these individually or traverse them as needed.

3.5 Management Network Abstraction

The management network 820 consists of local encapsulations of remote software entities such as the Cashless Services Database and Billing.

3.5.1 Cashless Service Database

The Cashless Services Database (CSDB) is a transaction protocol resource which handles operations for Chargecard (a known service in the UK).

3.5.1.1 CSDB Operations

The CSDB understands the validate operation. This operation has as parameters:
chargecard number
authcode(?)

3.5.2 Billing System

The billing system interface 1030 provides the following charge record interface capabilities:
ability to charge for the duration of a call by providing minimally the start time, stop time, dialled number, and Calling Line Identity (CLI) to a Customer Service System (CSS; known in connection with the current UK PSTN) via a call record to the Administration Data Network (ADN);
a flexible internal charging interface that provides product lines to raise charges based on the services utilized by the customer during a call (e.g. fax, voice message delivery or access to third party database products); the relevant information is forwarded to an Intelligent Network Management System (INMS) 120 for collation;
audit trails to meet the requirements specified by the network operator;
where relevant, conformance to relevant charging requirements for exchanges.

3.5.2.1 Toll Ticket

Figure 41:
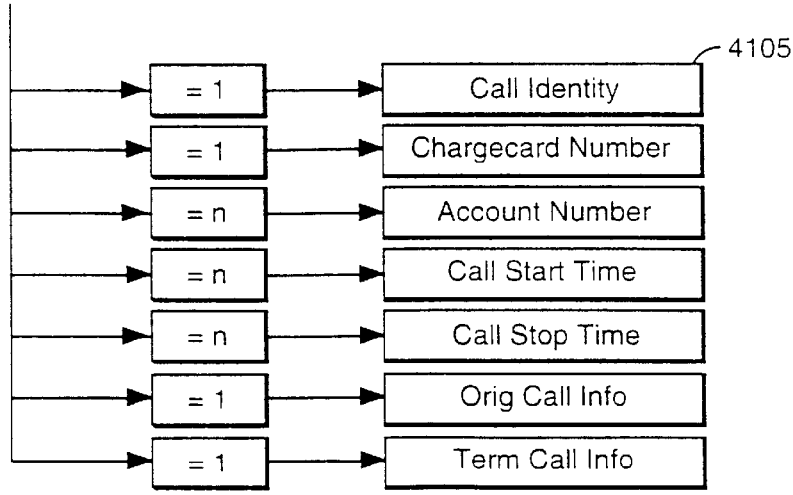

Referring to FIG. 41, the toll ticket 4100 is a commuting object that maintains call statistics. Services generate toll tickets 4100 and route them to the billing system 220. A toll ticket 4100 contains the following information:
call identity;
Chargecard number;
account number;
call start time;
call stop time;
originating call information;
terminating call information.

The network interconnect maintains a list of active dialogs, and matches the Call Identity 4105 with the dialogID of an active dialog to obtain more information on the call.

The toll ticket 4100 is routed by the network interconnect 810 to the software encapsulation of the billing system in the management system 820.

3.6 Network Interconnect

Figure 42:
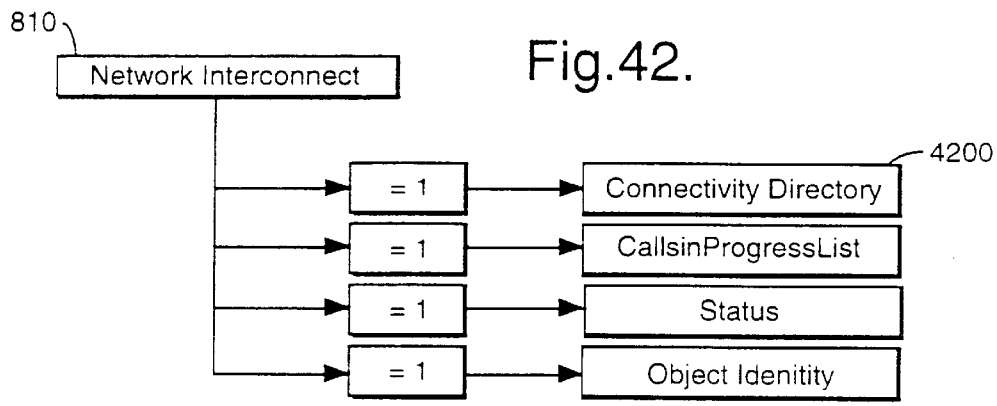

Referring to FIG. 42, the network interconnect 810 contains the connectivity information relating virtual and physical nodes. Nodes in the physical network 805 and nodes in the virtual network 800 are not aware of each other. Therefore, a service running in a virtual network 800 needs the network interconnect to find its associated physical node. Likewise, the network interconnect 810 assures that dialogs form the physical network 805 arrive at the correct virtual network 800.

3.6.1 Virtual Node

Figure 43:
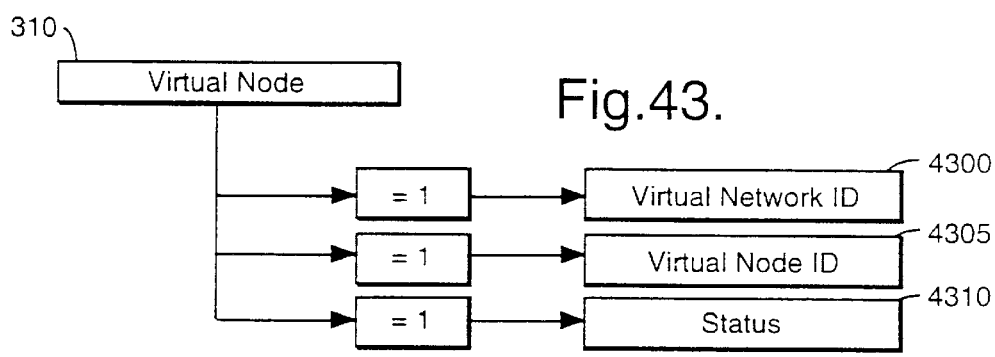

Referring to FIG. 43, a physical node 305 in the physical network 805 has users of a virtual network 800 connected to it. That node must be identified in some manner to the virtual network 800. A virtual node is a logical means of referring to physical nodes.

The virtual network has virtual nodes 310. Users are connected to a virtual node on the virtual network. Each virtual node has a name, and a virtual node address.

Virtual nodes 310 can be created or deleted only by the network provider for any virtual network 800. A virtual node 310 can exhibit a state of enabled or disabled. The administrator for the network operator is able to modify the state 4310 of a node. All new nodes are created with a state of disabled until explicitly enabled. A virtual network administrator is able to view virtual node information but unable to modify it.

3.6.1.1 Virtual Node Address

Every virtual node has and is referred to by a virtual node address. A virtual node address indicates the virtual network identity 4300 and the node 4305 within that network.

3.6.2 Physical Node Address

A physical node address is the access number into the system. On common access physical nodes, the access number can be either the number called (the dialled number) or the number called from (the calling line identity). With dedicated access the access number is the unique physical node identifier that is part of each physical node.

3.6.3 Virtual Network Discrimination

Referring to FIG. 24, all calls arrive at some physical node in the physical network 805. It is necessary to determine which virtual network should handle the call. Virtual network discrimination is achieved through the identification of the virtual node address that is associated with a particular physical node address. The virtual node address indicates the virtual network identity. The SDI connectivity information maintains the relationships between physical nodes 305 and virtual nodes 310. It is possible to associate a maximum of two physical network nodes 305 with one virtual network node 310, one being the originating node and one being the terminating node. A call is handled by a virtual network 800 if and only if all the following are asserted:

the physical node address is one that is known;

the physical node address is associated with a virtual node address;

a valid virtual network can be deduced;

the virtual network is active;

3.6.4 Physical Node Discrimination

Services run with knowledge of only the virtual nodes within its particular virtual network 800. Physical network discrimination is achieved through the identification of the physical node address that is associated with a particular virtual node address. The physical node address uniquely identifies the physical node. The SDI connectivity information maintains the relationships between virtual nodes and physical nodes. A call is handled by a virtual network 800 if and only if all the following are asserted:

the virtual node address is one that is known;

the virtual node address is associated with a physical node;

the physical node is active.

FIG. 24 shows the interactions between the components of the SDI 200 in applying the above virtual network and physical node discrimination.

3.6.5 Connectivity Directory

The purpose of Network Interconnect 810 is to maintain the connectivity information between the virtual and physical networks. The connectivity information is stored in the connectivity directory 4200. It contains persistent, provisionable mappings of physical node address with virtual node address. Given a physical network address, the connectivity directory will return the associated virtual network address. Given a virtual node address it will return the associated physical network address. It is possible to associate a maximum of two physical node addresses with one virtual node address—the originating and terminating node. Undefined originating or terminating attributes signify that a node is incapable of carrying originating or terminating calls respectively. This enables the virtual network to distinguish between different origination and termination behaviour for a user of the virtual network. These relationships are provisionable by the BT network administrator.

3.7 Persistence Model

Persistence is obtained using Objectivity/DB OODB (Object Oriented Data Base) to store selected objects.

3.7.1 Design

The philosophy of hiding the underlying object persistence implementation is implemented by creating a standard interface between applications and the OODB. The design might use persistent keyed objects stored in dictionaries. The interface is the PersistentDictionary class.

3.7.2 Persistent Classes

Figure 25:
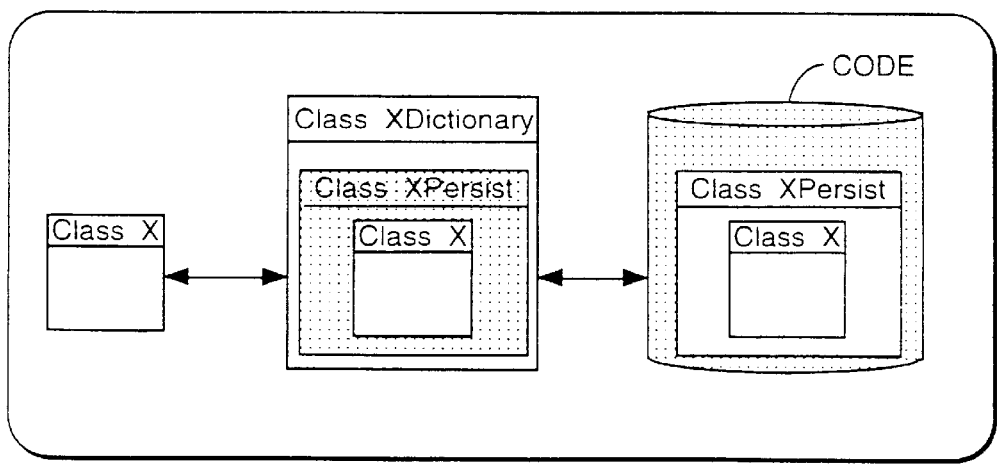
FIG. 25 shows a dictionary class interface for use in provision of persistent objects.

A persistent class means that some or all instances of a class are stored in a database. When an application developer determines that a class needs persistence, the application developer gives the class declaration to the database developer. The database developer encapsulates the application developer's class by wrapping a persistent version of the class around the original class. In essence, the application developer's class becomes an embedded object inside the persistent wrapper class. Referring to FIG. 25, the wrapper class is persistent by inheriting from a persistent superclass. The wrapper class is a persistent class which contains the application developer's original class.

3.8 Log

An SDI 200 may also have a log utility which other components can use to log activity and event messages. The log utility will preferably interface with the UNIX file system.

3.9 Process Management Control

The components of the SDI 200 and services that run under its auspices are all contained within a finite set of manageable processes on the target platform. These processes can be managed in two ways, i.e. invasively by an operator or automatically by heartbeats. In the following, the action taken by the operator for Process Management Control is discussed. Each managed process accepts the following stimuli for the purpose of process control:

disable (go out of service)

enable (come in service)

reinitialise

The following are the different states the process can be in depending on what action (shown above) is performed:

In Service

Out Of Service

Active

Idle

Human Busy (hbsy)

Machine Busy (mbsy)

Initialised/Reinitialise

Figure 26:
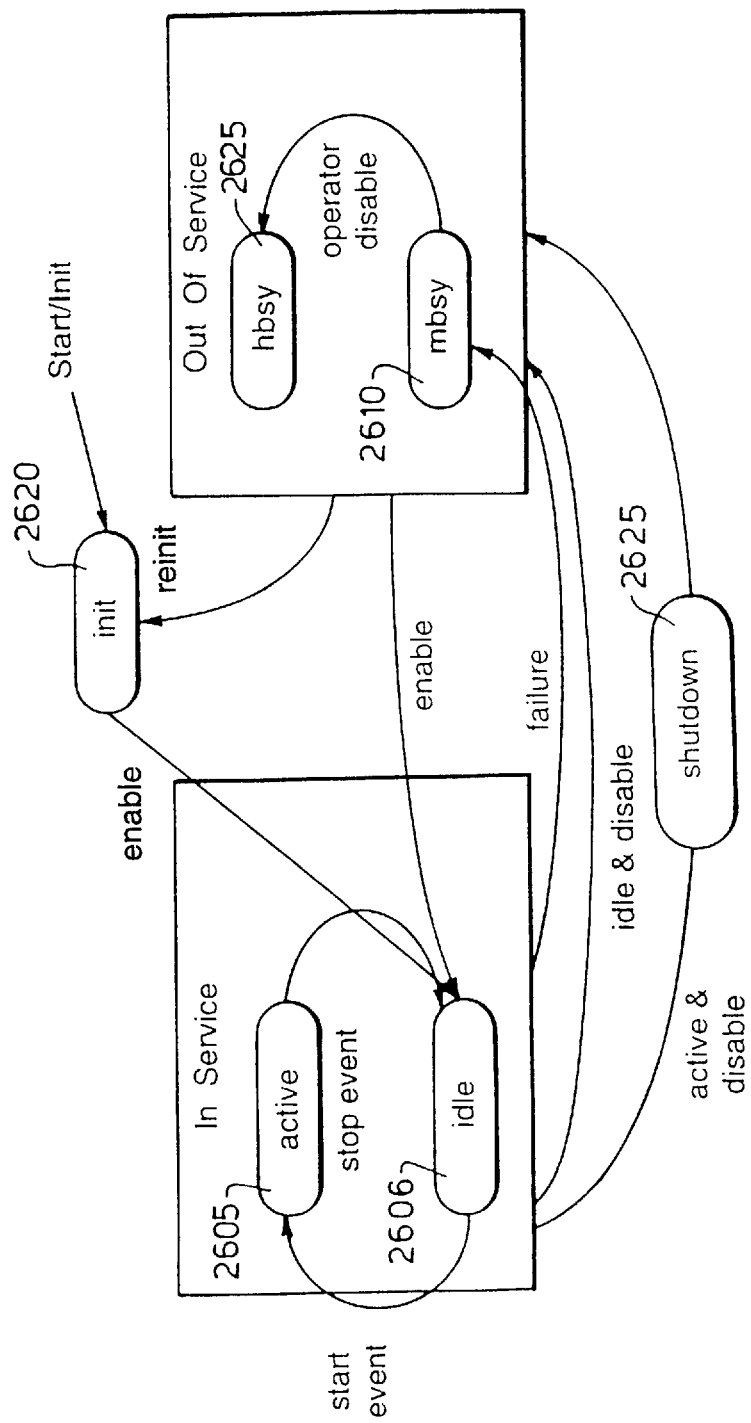
FIG. 26 shows a process control state transition diagram for processes run on a target platform to embody the SDI.

FIG. 26 shows the Process Control State Transition Diagram.

When a process goes through the initialisation phase it is transitioned to idle state 2600. At this point it is ready to accept tasks. When a task is assigned to a process, it goes into active state 2605. If the process fails to respond to a heartbeat it is put in Out Of Service Machine Busy (mbsy) 2610 state. From mbsy state, an operator can put it into Human Busy (hbsy) 2615 state. From mbsy state a process can try ti reinitialise itself and automatically go into init state 2620 or from mbsy it can go into idle state 2600. An operator can also initiate resume to put process into idle state. If disable is executed either automatically or by an operator and process is in idle state, it goes into mbsy or hbsy respectively. If disable is executed either automatically or by an operator and the process is active, it goes into shutdown state 2625 and until the process finishes up its task and cleans itself. After the task is finished then the process goes into mbsy or hbsy depending on who initiated the disable.

4. SCE/SDI INTERACTION

Referring to FIGS. 44 to 47, process diagrams for SCE/SDI interactions can be described as follows.

4.1 Service Creation on the SDI

Figure 44:
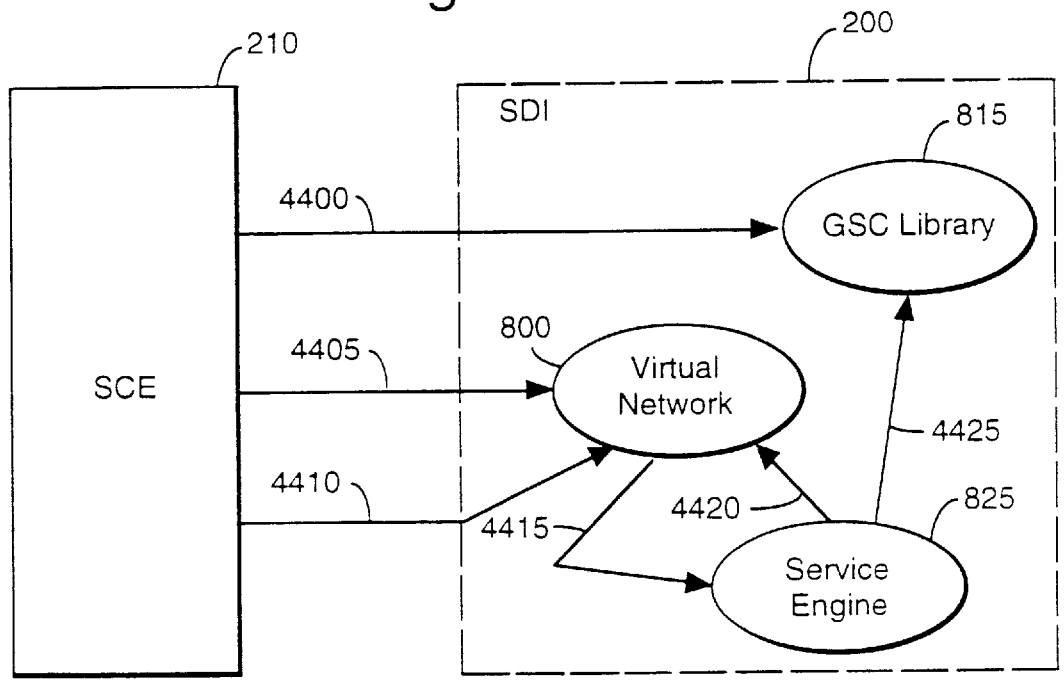

Referring to FIG. 44, the process for service creation on the SDI 200 entails the following steps:

STEP 4400: GSCs are developed in the SCE 210 and deployed into the GSC Library 815.

STEP 4405: Services, specified in terms of Service Packages which utilise components in the GSC Library 815, are deployed into a Virtual Network 800.

STEP 4410: A service is activated, when required, in the Virtual Network 800.

STEP 4415: The Virtual Network 200 informs the Service Engine 825 of the activation.

STEP 4420: The service Engine 825 retrieves the service from the Virtual Network 800.

STEP 4425: The Service Engine 825 resolves the references in the service.

4.2 Virtual Network Provisioning on the SDI

Figure 45:
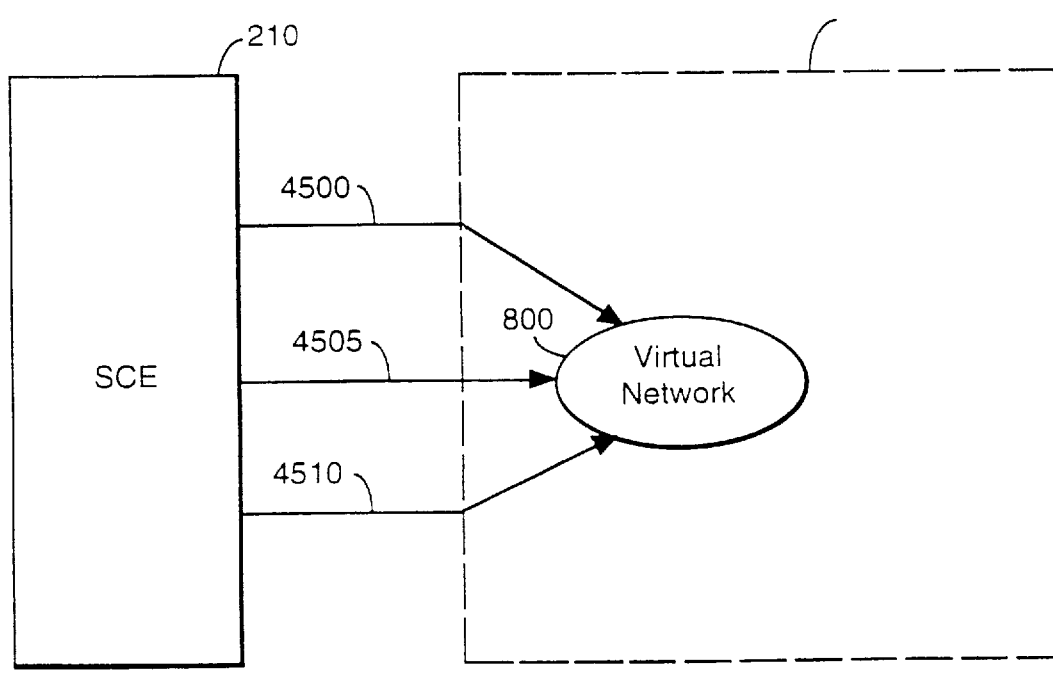

Referring to FIG. 45, the process for creation and deployment of a virtual network 800 on the SDI 200 is as follows:

STEP 4500: A Virtual Network 800 is created and assigned a VN id.

STEP 4505: Virtual Network Addresses and Virtual Directory Numbers are created and deployed, together with VNA and VDN associations.

STEP 4510: User Profiles are created and deployed, containing user data, VDN Service Profile references and any necessary "VDN to Service Profile ID" association.

4.3 Physical Network/NetworkInterconnect Provisioning on the SDI

Figure 46:
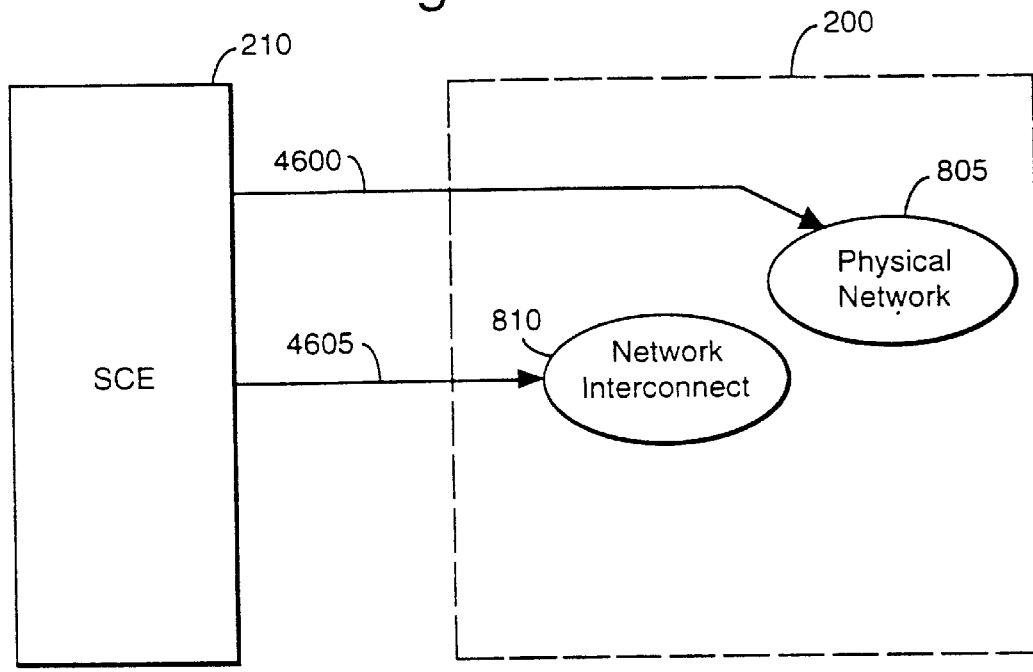

Referring to FIG. 46, the process for the above is as follows:

STEP 4600: Virtual encapsulations of switches are provisioned with switch and trunk IDs.

STEP 4605: Physical Nodes and Virtual Nodes are declared and provisioned to the Network Interconnect 810. Physical Node—Virtual Node associations are crated and deployed.

4.4 Service (Instance) Provisioning on the SDI

Referring to FIG. 47, the service (instance) provisioning process is as follows:

STEP 4700: A Service Profile is created and deployed to a Virtual Network 800 in the SDI 200.

STEP 4705: A user Profile is updated with a VDN and a Service Profile reference and deployed.

5. PROCESSING AN INCOMING CALL ON THE SDI

Figure 48:
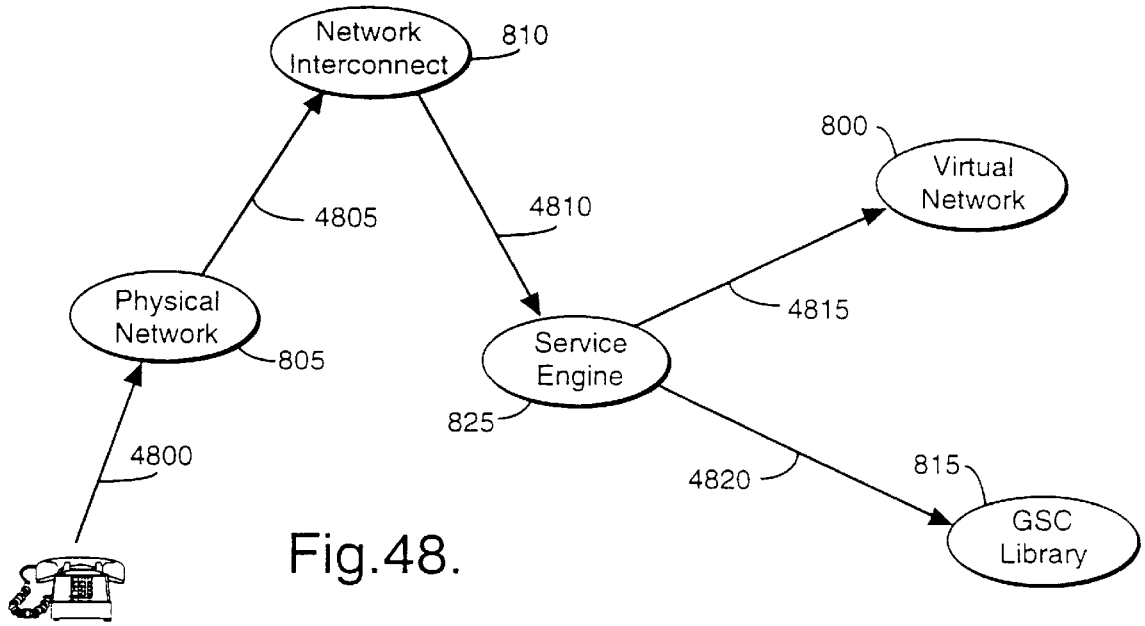

Referring to FIG. 48, the following steps are involved in the real-time processing of an incoming call on the SDI:

STEP 4800: A call is made and arrives at the Physical Network encapsulation 805 on the SDI 200.

STEP 4805: A physical network address is constructed. The Virtual Call Model is updated with the incoming call, and the incoming call is forwarded towards a Virtual Network 800, via the NetworkInterconnect 810.

STEP 4810: Network Discrimination is performed; the incoming Physical Node information is used to determine a Virtual Node 310 and hence a Virtual Network 800. A Virtual Network Address is constructed and the Call passed to the Service Engine 825.

STEP 4815: Service Discrimination is performed; the Virtual Network Address is used to key into the Virtual Network 800 to obtain User and Service Profiles.

STEP 4820: GSCs reference in the service are located and executed to perform necessary call processing.

The SDI 21 structure, as described above, can support evolution without requiring interruption to service and an aspect of this is further described below.

When a customer or user requires to access a relevant virtual network 800 to be provided with a service, then the SDI 200 will respond, provided that there is no problem such as lack of authorisation or the service being unavailable on the relevant virtual network 800. The manner in which a service is actually triggered involves the software blackboard technique mentioned above, wherein sufficient pieces of data must be present before a required feature for use in the service will "fire". One of the factors in the firing of features is the content of various profiles, these being (as indicated above) tailored sets of data relevant to, for instance, the network operator, a customer, or a customer user.

A profile can be viewed as the specification of a set of attributes describing how a particular service instance is to be tailored. Profiles can be global across all networks 800, for instance network operator defined profiles, network wide to a particular virtual network 800, or specific to a particular user. Where conflict arises, the priority of profiles will be first the network operator, then the customer (for instance where the customer is an entity responsible for bills on behalf of multiple users) and finally the single user.

A profile contains:
1. the virtual network DN,
2. user attributes, these being default declarations of call state that are established when a caller initiates a call and would include things such as default call type (speech, 3.1 kHz, data),
3. authorisation code,
4. rule list,
5. feature lists( originating and terminating).

Looking at the last of the above, every profile has lists of features that are available. Features are classified as originating features (for example outgoing calls barred, originating screening, network side updates, restricted access etc) or terminating features (for example incoming calls barred, terminating screen, call forward, divert on busy etc). Every profile has two feature lists, one of originating and one of terminating features. A feature list contains, for every feature, the feature name, feature view and feature instance reference. The feature instance reference points to the provisioned persistent feature object instance for this profile. The feature list may in practice by empty.

Feature views are the representation of a call state that fulfils the conditions for that feature to be invoked. The view that a feature requires is specified by the feature provider in the feature package. The view for a feature is specified in terms of the presence or absence of an element of the call context picture and expressed in boolean algebra syntax.

The interaction of features is governed by feature interaction rules defined for that profile. Every profile has a rule list. The rules governing use of the virtual network 800 and features offered by it are contained within the rule list. Rules control feature interaction and would determine which features with coincident views would be allowed to obtain focus on the call. The elements of the rule list contain the rule and the view for that rule. The rule list may also be empty.

Rule views are the representation of a call state that fulfils the condition for a rule to be applied. The view that a rule requires is specified as part of the provisioning object that adds a rule to a profile. The view for a rule is specified similarly to feature views.

The network operator, providing the bearer network 100 for all the separate customer virtual networks 800, can use a network operator profile to govern how the virtual networks 800 behave. Any global rules or attributes that apply are defined here. Any features that control or specify specialised access mechanisms will be referenced in the network operator profile.

A customer (user) profile provides the customer with the ability to govern the behaviour of all users of his network 800. Rules, attributes and features that apply network wide are specified in the customer profile.

Every virtual network DN has an associated user profile describing what is available to that number on the virtual network 800. User profiles are contained within the customer virtual network user list. A user profile is retrieved based on either the authorisation code or the virtual network DN, and on the time of day. Thus a user gains his virtual network attribute set by either virtual network DN and/or an authorisation code.

BLACKBOARD TECHNIQUE IN PROVIDING SERVICES

In the SDI 200, a blackboard is a software object that maintains a picture of a call state. The picture changes as a call is progressed by the addition, subtraction and modification of scenes by other objects posting to the blackboard.

Blackboard systems are known, for instance in a military context where, for example, a fighter pilot has to process incoming data in order to select from a range of actions. The model is a knowledge-based system monitoring the input and advising the pilot when something interesting occurs; e.g. when a real target or threat is identified among many dummy target or threats. The financial trader is in a similar position, being the recipient of vast quantities of data from several information feeds, all of them in need of analysis to determine (a) if anything interesting has occurred requiring further analysis, and (b) what the appropriate action should be.

A blackboard system is so called because it imitates a group of highly specialised experts sitting around a blackboard in order to solve a problem. As new information arrives it is written up on the blackboard where all the experts can look. When an expert sees that s/he can contribute a new fact based on specialist knowledge, s/he raises a hand. This might be to confirm or refute an hypothesis already on the board or to add a new one. The new evidence will now be available to the other experts who may in turn be prompted to contribute to the discussion. The chairman of the group monitors the experts and selects their contributions in order, according to an agenda visible on the board. Common storage is the blackboard, and the agenda is under the control of a specialised inference program.

If the components of a blackboard system need to communicate, there are essentially two methods of achieving this. Object-oriented systems allow objects to send and receive messages which have definite destination objects when sent. In blackboard systems the messages are posted to a common data area which is accessible to other objects. Sometimes the blackboard is partitioned into pigeonholes. Usually, messages must be dealt with according to the order in which they arrive and the state of the receiving object at that time.

A call picture is the part of a blackboard which is visible to external objects. The call picture maintains the call state.

An external object may have a view on a call picture, that is a limited number of scenes of interest to the object. However, the object is not allowed to act until it has focused on its view. The focus is controlled and is used to sequence objects acting on the blackboard.

A scene is applied to the blackboard by means of posting. A scene is an individual element of a call picture that can be modified by external objects. Scenes combine to form a view.

The above is terminology of a blackboard technique which is used in providing a service by reference to a candidate list of features, using the SDI 200 of the present invention. The technique is effectively a hybrid of associative and sequential processing, as used herein. It provides a practical real-time response by restricting the extent of pattern matching necessary to fire a feature, by incorporating in the relevant profiles a candidate list of features which is s subset of all possible features. There is, in practice, then a trade-off for the customer. The longer the candidate list of features to be available via their service network, the greater the risk of reduced performance from the network in providing services.

The blackboard technique functions as follows, for the originating leg of a call. The SDI 200 makes a translation to a virtual network DN and retrieves a user profile based on the originating DN. The user profile contains a list of originating and terminating features that may be invoked during the call. Features are allowed to focus on the call picture represented on the virtual network blackboard, under the control of the SDI 200 and the invocation of feature rules, until a quiescent state, resulting in a terminating DN, is reached. Translation from the logical world back to physical representations occurs when the feature requires further network interaction or the call is complete and requires a terminating leg.

If it is not possible to identify a user from the physical identifiers provided by the virtual network 800, the SDI 200 will prompt for an authorisation code. This will be used to allocate an originating DN so that a profile may be retrieved and feature processing may proceed.

Figure 27:
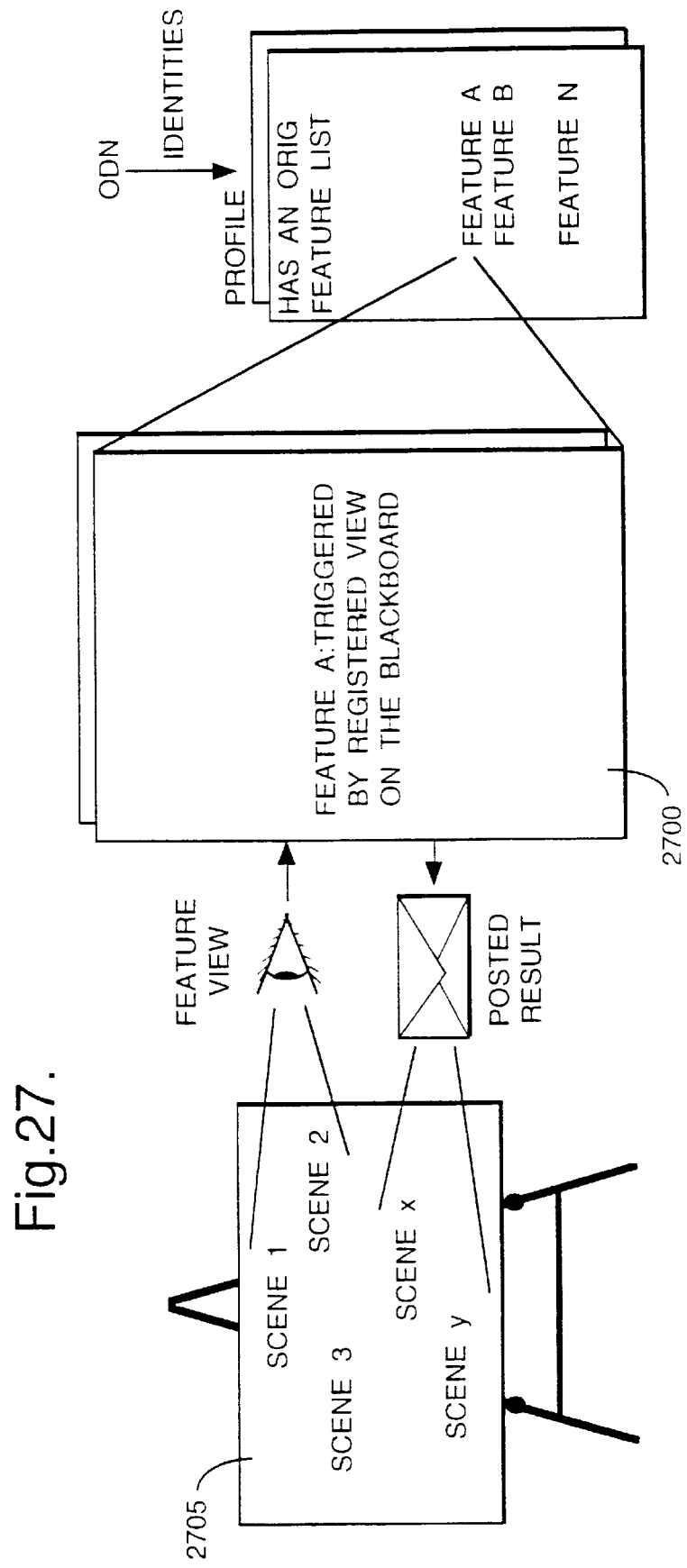
FIG. 27 shows a pictorial representation of steps carried out by the SDI and related applications in response to an incoming call, to trigger relevant features.

A simplified representation of the retrieval of a profile form a service network DN, in this case an originating DN, is shown in FIG. 27. The feature 2700 registers a view with the blackboard 2705. If there are sufficient elements of data present, that is there is a new phone number together with the state of 'no reply' for the feature 'Call forward on no reply', then the feature will be triggered by the view. Consequently, it will process the view plus any additional parameters and post back resulting scenes to the blackboard 2705. Other features viewing the blackboard may then, when invited to focus on their view of the call picture, be triggered by the scenes posted as a result of another feature processing its view.

In the present specification, the terms "encapsulation" and "virtual encapsulation" are both simply used to refer to the technique known in object oriented technology of creating software realisations of real work entities by embedding data relevant to the entity in process software for accessing or controlling the data. This means that the data cannot be accessed directly, only by means of the process software.

Reference is made in places to "calls". This should be taken to include non-voice, and any other type, of requests for services over a communications network. The SDI approach is of course sufficiently flexible that the services concerned should not be taken to be only those already available today but may be extended in the future, to take account of future developments.

There may be found references to "BT". This stands for the name of the applicant in the present invention, but should be read more generally to include any entity in the role of network provider, operator or carrier.

In the description of FIG. 45, there is reference to "associations". This is simply intended to mean association by mapping.

It should be noted that there may be more than one communications network, and more than one network operator involved in carrying services in embodiments of the present invention.

What is claimed is:

1. A communications service delivery system, for providing one or more communications services to one or more users of a communications network, the network comprising physical locations by means of which the services are provided, the locations each having an associated physical location identifier, wherein the system comprises:
   i) an input for receiving request for a service to be provided with respect to a physical location of the communications network;
   ii) a feature data store, for storing units of executable code, selected sets of which can be executed in a predefined order to provide a service, different respective sets supporting provisions of different services;
   iii) means for executing units of executable code;
   iv) a processor for selecting said sets of units of executable code and identifying them to said means for executing them so as to provide a requested service;
   v) a virtual network data store, for storing a plurality of virtual network representations, each representation comprising:
      a) a set of virtual location identifiers for identifying locations of a respective virtual network,
      b) one or more user identifiers, and
      c) a user profile associated with each user identifier and containing data identifying one or more services, and user-specific parameters of the one or more identified services;
   vi) a service package store for storing service packages, each service package containing references for a selected set of units of executable code form the feature data store together with the relevant predefined order; and
   vii) a mapping information store for use in mapping between the virtual networks and physical location identifiers for locations of the communications network;
   whereby the processor is provided with means to respond to a request for a service, received at the input, by identifying one or more service packages to the means for executing units of executable code, and providing user-specific parameters, such that said means can locate the relevant units in the feature data store and execute them, modified with the user-specific parameters to provide the requested service.

2. A system as in claim 1 wherein the service package store is distributed among the virtual network representations, each virtual network representation comprising a service package store holding service packages relevant to one or more user profiles for that virtual network.

3. A communications service delivery system, for delivering services to users of a communications network by means of physical locations in the network, each physical location having an associated physical location identifier, one or more services preselected from a group of services being available to each user, or set of users, wherein the service delivery system is provided with means to receive a request for service provision, and service execution means for providing a service in response to a request, and wherein the system is further provided with the following data structures:
   i) a library of service independent features for use in providing a service over the communications network;
   ii) an array of virtual networks, each virtual network being allocated to a user or set of users, and each virtual network being defined in the array by a set of virtual location identifiers together with an indication of the service or services allocated to its user or set of users and user-specific data for that service or services; and
   iii) mapping between the physical location identifier and the virtual location identifier;
   the service execution means being connected to the mapping data structure for identifying a virtual network relevant to a received request, (b) to the array of virtual networks for accessing a virtual network identified with respect to a received request, and (c) to the library of service independent features in order to locate and execute service independent features together with the relevant user-specific data in the provision of a service in response to the received request in the context of the identified virtual network.

4. A service delivery system as in claim 3 wherein each virtual network comprises an object encapsulating data relevant to a set of virtual locations which can be mapped to selected physical locations of the communications network.

5. A service delivery system as in claim 3 wherein the data structures are each encapsulated in associated process software to provide an object.

6. A service delivery system as in claim 1 wherein the location identifiers are data structures embedded in software representations of one or more communications networks.

7. A service delivery system as in claim 1 comprising objects representing at least one of the following:
   a management system of the communications network;
   a library of service independent features for providing services over the communications system;
   a service execution engine;
   a communications transport network comprising all or part of the communications system;
   mapping functionality for mapping virtual locations to physical locations of the communications network; and
   a virtual network dedicated to services available to a particular user or set of users.

8. A service delivery system as in claim 1 wherein the communications network comprises networks of more than one network operator.

9. A service delivery system as in claim 1, wherein a service is delivered by means of co-operation between objects representing at least one of the following:
   a management system of the communications network;

a library of service independent features for providing services over the communications system;

a service execution engine;

a communications transport network comprising all or part of the communications system;

mapping functionality for mapping virtual locations to physical locations of the communications network; and a virtual network dedicated to services available to a particular user or set of users.

10. A service delivery system as in claim 1 which presents a common programming interface to elements of the communications network in providing, modifying, enhancing or adding a service.

11. A system as in claim 1 wherein the processor is common to a plurality of, or all of, the virtual network representations.

12. A method of providing a communications service to one or more users of a communications network, wherein the method comprises the steps of:

A) storing units of executable code, selected sets of which can be executed in a predefined order to provide communications services with respect to physical locations of the network, B) storing a plurality of virtual network representations, each of which comprises:
  a) set of virtual location identifiers for identifying locations of a respective virtual network,
  b) one or more user identifiers, and
  c) a user profile associated with each user identifier and containing data identifying one or more services, and user-specific parameters of the one or more identified services;

C) storing a plurality of service packages, each service package containing references for a selected set of said units of executable code together with the relevant predefined order;

D) storing mapping information for mapping between said virtual location identifiers and physical locations of the communications network;

E) receiving a request for a service in relation to a physical location of the communications network;

F) accessing the mapping information to identify a relevant virtual network representation;

G) accessing the virtual network representation for the identified virtual network;

H) verifying by reference to the user identifiers and user profiles stored in the virtual network representation that the requested service is available in response to the request;

I) identifying a relevant service package; and

J) executing the selected set of units of executable code referenced in the service package, modified by user-specific parameters from the virtual network representation.

13. A method as in claim 12 wherein the service packages are stored in a plurality of service package stores, each being comprised by a virtual network representation.

14. A method as in claim 12 wherein each virtual network representation is structured as data encapsulated in process software to provide an object.

* * * * *